US006611394B1

(12) United States Patent
Kato et al.

(10) Patent No.: US 6,611,394 B1
(45) Date of Patent: Aug. 26, 2003

(54) RECORDING MEDIUM, TAPE DRIVE, AND METHOD FOR IDENTIFYING TYPE OF RECORDING MEDIUM

(75) Inventors: Tatsuya Kato, Kanagawa (JP); Katsumi Ikeda, Kanagawa (JP); Osamu Nakamura, Kanagawa (JP); Yasuaki Kano, Kanagawa (JP); Katsumi Maekawa, Tokyo (JP); Yoshihisa Takayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/622,296

(22) PCT Filed: Dec. 20, 1999

(86) PCT No.: PCT/JP99/07134

§ 371 (c)(1),
(2), (4) Date: Aug. 15, 2000

(87) PCT Pub. No.: WO00/38188

PCT Pub. Date: Jun. 29, 2000

(30) Foreign Application Priority Data

Dec. 18, 1998 (JP) .......................................... 10/360794

(51) Int. Cl.⁷ .............................................. G11B 15/18
(52) U.S. Cl. ........................................................ 360/69
(58) Field of Search ............................... 360/69, 60, 48

(56) References Cited

U.S. PATENT DOCUMENTS

| 5,852,534 A | * 12/1998 | Ozue et al. ................. 360/134 |
| 5,901,007 A | * 5/1999 | Oguro et al. ................ 360/132 |
| 5,923,486 A | * 7/1999 | Sugiyama et al. ............ 360/60 |
| 5,971,281 A | * 10/1999 | Frary et al. ................. 235/385 |
| 6,128,148 A | * 10/2000 | Platte et al. ................. 360/27 |
| 6,134,066 A | * 10/2000 | Takayama et al. ............ 360/60 |
| 6,195,007 B1 | * 2/2001 | Takayama et al. .......... 235/375 |
| 6,425,042 B1 | * 7/2002 | Ikeda et al. ................. 360/69 |

FOREIGN PATENT DOCUMENTS

| EP | 0978841 A2 | * 9/2000 | .......... G11B/27/11 |
| JP | 02000182357 A | * 6/2000 | .......... G11B/27/00 |

* cited by examiner

Primary Examiner—David Hudspeth
Assistant Examiner—K. Wong
(74) Attorney, Agent, or Firm—Jay H. Maioli

(57) ABSTRACT

When a memory in cassette (MIC) in a loaded tape cassette can successfully be accessed, an MIC type stored in the MIC is detected to judge a data format the tape cassette has. To this end, the tape cassette is adapted such that the data format or the loaded tape cassette can be identified without detecting an identification hole formed in the tape cassette. Thus, it is possible to easily accommodate any future extension of the data format.

13 Claims, 30 Drawing Sheets

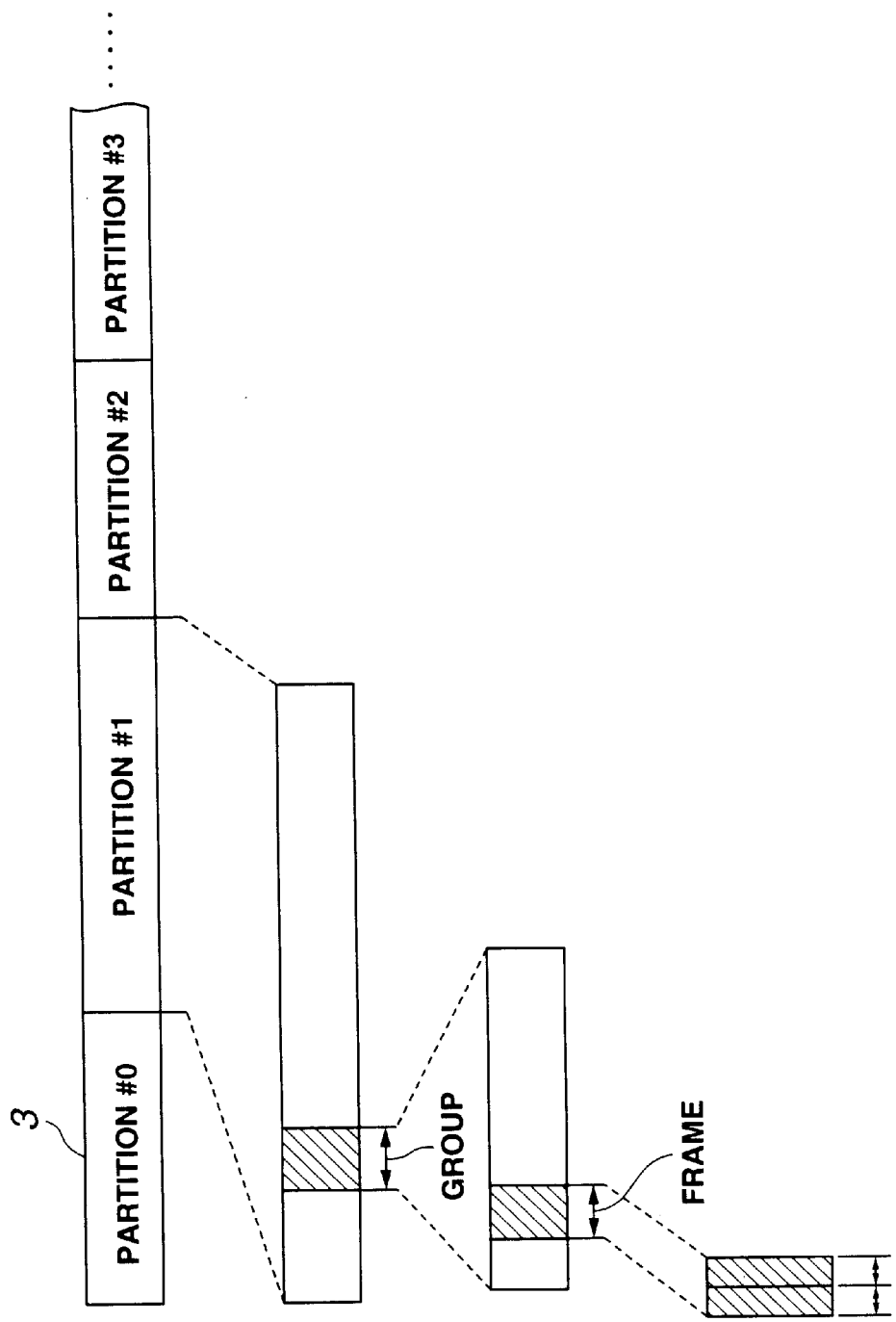

| | | |
|---|---|---|
| FL11 | MANUFACTURE PART CHECK SUM | 1 BYTE |
| | MIC TYPE | 1 BYTE |
| | MIC MANUFACTURE DATE | 4 BYTES |
| | MIC MANUFACTURE LINE NAME | 8 BYTES |
| | MIC MANUFACTURE PLANT NAME | 8 BYTES |
| | MIC MANUFACTURE NAME | 8 BYTES |
| | MIC NAME | 8 BYTES |
| | CASSETTE MANUFACTURE DATE | 4 BYTES |
| MANUFACTURE INFORMATION (FL1) | CASSETTE MANUFACTURE LINE NAME | 8 BYTES |
| | CASSETTE MANUFACTURE PLANT NAME | 8 BYTES |
| | CASSETTE MANUFACTURE NAME | 8 BYTES |
| | CASSETTE NAME | 8 BYTES |
| | OEM CUSTOMER NAME | 8 BYTES |
| | RESERVED | 1 BYTE |
| | PHYSICAL TAPE CHARACTERISTIC ID | 1 BYTE |
| | MAXIMUM CLOCK FREQUENCY | 2 BYTES |
| | MAXIMUM WRITE CYCLE | 1 BYTE |
| | MIC CAPACITY | 1 BYTE |
| | WRITE PROTECT START ADDRESS | 2 BYTES |
| | WRITE PROTECT BYTE COUNT | 2 BYTES |
| | RESERVED | 2 BYTES |

FIG.9

MIC TYPE (FL11)

| BYTES | BIT POSITION | VALUE | DEFINITION |
|---|---|---|---|
| 1 | 7,6,5,4 | 0000 | AIT-1 |
| | | 0001 | AIT-2 |
| | | 0010 | AIT-3 |
| | | 0011 | AIT-4 |
| | | 0100 | RESERVED |
| | | ⋮ | RESERVED |
| | | 1111 | RESERVED |
| | 3,2,1,0 | 0000 | RESERVED |
| | | 0001 | MIC INTERFACE IS 5-PIN CONTACT |
| | | 0010 | RESERVED |
| | | ⋮ | RESERVED |
| | | 0100 | RESERVED |
| | | 0101 | MIC INTERFACE IS RF TYPE 1 |
| | | 0110 | RESERVED |
| | | ⋮ | RESERVED |
| | | 1111 | RESERVED |

FIG.10

| | |
|---|---|
| DEVICE INITIALIZE PART CHECK SUM | 1 BYTE |
| MIC LOGICAL FORMAT TYPE | 1 BYTE |
| ABSOLUTE VOLUME MAP POINTER | 2 BYTES |
| USER VOLUME NOTE CELL POINTER | 2 BYTES |
| USER PARTITION NOTE CELL POINTER | 2 BYTES |
| PARTITION INFORMATION CELL POINTER | 2 BYTES |
| RESERVED | 1 BYTE |
| VOLUME ATTRIBUTE FLAGS | 1 BYTE |
| FREE POOL TOP ADDRESS | 2 BYTES |
| FREE POOL BOTTOM ADDRESS | 2 BYTES |

MEMORY MANAGEMENT INFORMATION (FL2)

| | | |
|---|---|---|
| FL31 { | VOLUME INFORMATION CHECK SUM | 1 BYTE |
| | VOLUME INFORMATION | 100 BYTES |
| VOLUME TAG (FL3) | ACCUMULATIVE PARTITION INFORMATION CHECK SUM | 1 BYTE |
| | ACCUMULATIVE PARTITION | 56 BYTES |
| | VOLUME NOTE CHECK SUM | 1 BYTE |
| | VOLUME NOTE | 8 BYTES |
| | CARTRIDGE SERIAL NUMBER | 32 BYTES |
| | MANUFACTURE ID | 1 BYTE |
| | SECONDARY ID | 1 BYTE |
| | CARTRIDGE SERIAL NUMBER PART CHECK SUM | 1 BYTE |
| | RESERVED | 1 BYTE |
| | SPECIFIC VOLUME TAG 1 | 36 BYTES |
| | SPECIFIC VOLUME TAG 2 | 36 BYTES |
| | SPECIFIC VOLUME TAG 3 | 36 BYTES |
| | SPECIFIC VOLUME TAG 4 | 36 BYTES |
| | SPECIFIC VOLUME TAG 5 | 36 BYTES |
| | SPECIFIC VOLUME TAG 6 | 36 BYTES |
| | SPECIFIC VOLUME TAG 7 | 36 BYTES |
| | SPECIFIC VOLUME TAG 8 | 36 BYTES |
| | SPECIFIC VOLUME TAG 9 | 36 BYTES |
| | SPECIFIC VOLUME TAG 10 | 36 BYTES |
| | SPECIFIC VOLUME TAG 11 | 36 BYTES |
| | SPECIFIC VOLUME TAG 12 | 36 BYTES |
| | SPECIFIC VOLUME TAG 13 | 36 BYTES |

FIG.13

SYSTEM LOG ALLOCATION FLAGS (FL312a)

| b4 | b3 | DEFINITION |
|----|----|------------|
| 0 | 0 | SYSTEM LOG EXISTS ONLY ON TAPE |
| 0 | 0 | SYSTEM LOG EXISTS ON NEITHER TAPE NOR MIC |
| 1 | 1 | SYSTEM LOG EXISTS ON BOTH TAPE AND MIC |
| 1 | 1 | SYSTEM LOG EXISTS ONLY ON MIC |

FIG.16

AIT NATIVE FLAG (FL312b)

| b1 | DEFINITION |
|---|---|
| 1 | AIT MODE |
| 0 | DDS EMULATION MODE |

FIG.17

CELL STRUCTURE

FIG.18A

| LINK INFORMATION | 8 BYTES |
|---|---|
| DATA | (n) BYTES |

LINK INFORMATION

FIG.18B

| CELL CHECK SUM | 1 BYTE | |
|---|---|---|
| RESERVED | 1 BYTE | |
| CELL SIZE | 2 BYTES | 8 BYTES |
| PREVIOUS CELL POINTER | 2 BYTES | |
| NEXT CELL POINTER | 2 BYTES | |

PARTITION INFORMATION CELL

| | LINK INFORMATION | 8 BYTES | |
|---|---|---|---|
| DATA | PARTITION MEMO | 8 BYTES | 56 BYTES |
| | PARTITION INFORMATION | 48 BYTES | |

FIG.19

PARTITION INFORMATION

| | | | |
|---|---|---|---|
| PREVIOUS GROUPS WRITTEN | | | 4 BYTES |
| TOTAL GROUPS WRITTEN | | | 4 BYTES |
| RESERVED | | | 1 BYTE |
| PREVIOUS GROUPS READ | | | 3 BYTES |
| TOTAL GROUPS READ | | | 4 BYTES |
| RESERVED | | | 1 BYTE |
| TOTAL REWRITTEN FRAMES | | | 3 BYTES |
| RESERVED | | | 1 BYTE |
| TOTAL 3RD ECC COUNT | | | 3 BYTES |
| ACCESS COUNT | | | 4 BYTES |
| UPDATE REPLACE COUNT | | | 4 BYTES |
| PREVIOUS REWRITTEN FRAMES | | | 2 BYTES |
| PREVIOUS 3RD ECC COUNT | | | 2 BYTES |
| RESERVED | | | 1 BYTE |
| LOAD COUNT | | | 3 BYTES |
| RESERVED | | | 1 BYTE |
| VALID MAXIMUM ABSOLUTE FRAME COUNT | | | 3 BYTES |
| FLAG BYTES (PARTITION ATTRIBUTE FLAG) | BIT 1 | PREVENT WRITE | 1 BYTE |
| | BIT 2 | PREVENT READ | |
| | BIT 3 | PREVENT WRITE RETRY | |
| | BIT 4 | PREVENT READ RETRY | |
| | BIT 5 | RESERVED | |
| | BIT 6 | RESERVED | |
| | BIT 7 | RESERVED | |
| | BIT 8 | PARTITION OPEN/CLOSE | |
| MAXIMUM ABSOLUTE FRAME COUNT | | | 3 BYTES |

48 BYTES

FIG.20

| STRIPE | NOT PROVIDED | AIT-1 MODE |
|---|---|---|
| | PROVIDED | AIT-2,3,4 ··· MODE |

RECORDING MEDIUM, TAPE DRIVE, AND METHOD FOR IDENTIFYING TYPE OF RECORDING MEDIUM

TECHNICAL FIELD

The present invention relates to recording medium formed in the shape of a tape and encased in a cassette to a form a tape cassette, a tape drive to write or read data to or from the tape-shaped recording medium, and a method of discriminating the type of a recording medium loaded in the tape drive.

BACKGROUND ART

As a tape drive (tape recording and/or reproducing apparatus) capable of writing and/or reading digital data to and/or from a magnetic tape as a recording medium, a so-called tape streaming device has been proposed. The tape streaming drive can record tens to hundreds gigabytes of data for example. This recording capacity depends upon the length of a magnetic tape in a tape cassette used in the drive. Thus, the tape streaming drive is widely used to back up data recorded in a medium such as a hard disk used in a computer, etc. Also the tape streaming drive is conveniently used to store data having a large size such as image data.

As a typical example of the above-mentioned tape streaming drive, there has been proposed a one adapted to record or reproduce data into or from an 8-mm VTR tape cassette as a recording medium by a helical scanning method in which a rotary head is used.

In the above tape streaming drive, it is first necessary to judge whether or not a tape cassette loaded in the drive is a one supported by the tape streaming drive designed and manufactured under a standard.

Even a tape cassette of a type conforming to the standard for the tape streaming drive has to be judged to be a data storage one or a cleaning cassette.

Further, if there is available a plurality of data formats for the data streaming drive, it is necessary for even a tape cassette meeting the standard for the tape streaming drive to meet one of the data formats the tape cassette supports.

That is, the tape streaming drive has to be adapted to identify the type of a tape cassette loaded therein.

Generally, for identification of a tape cassette type, an identification hole is provided in the body of the tape cassette body and a detection mechanism or the like is provided in the tape streaming drive to detect the identification hole in the tape cassette body. In this case, at the tape streaming drive, the detection mechanism detects whether or not the identification hole is provided in the body of the tape cassette loaded in the drive to identify the type of the tape cassette loaded in the drive. Thus, it is possible to allow the tape streaming drive to operate correspondingly to the tape cassette type thus identified.

The tape streaming drive system has available kinds of data format increased frequently as necessary to improve the recording and reproduction reliability, recording density, etc. for example. Generally, it means that higher-order data formats will be added to the existing data formats. Therefore, along with the increased number of data formats, the tape streaming drive has to support a correspondingly increased number of tape cassette types.

As a matter of fact, however, it is difficult because of the space, etc. to form additional holes in the tape cassette body correspondingly to the addition of data formats. Also, with the addition of the data formats, the structure of the detection mechanism in the tape streaming drive will be complicated and larger in order to detect many identification holes formed in the tape cassette body. In this respect, it is not desirable to form additional identification holes in the tape cassette body correspondingly to the addition of the tape cassette types for use with the tape streaming drive.

DISCLOSURE OF THE INVENTION

Accordingly the present invention has an object to overcome the above-mention drawbacks of the prior art by making it possible to identify the type of tape cassette, especially, a data format of the tape cassette, without dependence upon the identification hole formed in a tape cassette body.

The above object can be attained by providing a recording medium including, according to the present invention:

a magnetic tape;

a cassette encasing the magnetic tape; and a memory provided in the cassette to store management information for management of data writeN to and/or read from the magnetic tape;

the magnetic tape having a data format for data written to and/or read from the magnetic tape and which corresponds to any of a plurality of predetermined data formats; and the memory having set therein a storage area for storage of data format identification information indicative of the corresponding data format.

According to another aspect of the present invention, the memory may be provided with terminals for transfer of information signals and which face the outside of the cassette.

According to another aspect of the present invention, the memory may be provided with a transmission and reception means for non-contact transfer of information signal.

According to another aspect of the present invention, the magnetic tape may have an area where an information signal is recorded, and the area be divided in three or more partitions.

According to another aspect of the present invention, system log allocation flags included in data format identification information recorded in the magnetic tape may be adapted to indicate that the data format identification information is recorded in the magnetic tape, and the data formation identification information be read from the magnetic tape when data formation identification information cannot be read from the memory.

According to another aspect of the present invention, it may be judged, based on a native flag included in the data format identification information read from the magnetic tape, which the area of the magnetic tape where the information signal is recorded has, a format in which the area is divided in three or more partitions or a format in which the area is divided in two or less partitions.

Also the above object can be attained by providing a tape drive to write and/or read information signals to and/or from a recording medium comprising a magnetic tape; a cassette encasing the magnetic tape; and a memory provided in the cassette to store management information for management of data written to or read from the magnetic tape; the magnetic tape having a data format for data written to or read from the magnetic tape and which corresponds to any of a plurality of predetermined data formats; and the memory having set therein a storage area for storage of data format identification information indicative of the corresponding data format. In addition, the tape drive according to the present invention includes;

tape driving means for writing and/or reading information signals to and/or from the magnetic tape in the loaded recording medium;

memory reading means capable of reading at least the data format identification information from the management information stored in the memory in the loaded recording medium; and a data format identifying means for identifying, based on the data format identification information read by the memory reading means, a data format the loaded recording medium has.

According to another aspect of the present invention, the tape drive may further include means may, for controlling the data driving means, the tape driving means write and/or read on information signal in a data format selected from at least two of the plurality of predetermined data formats, and the controlling means allow the tape driving means to write and/or read in the data format identified by the data format identifying means.

According to another aspect of the present invention, the tape drive may further include a hole detecting mechanism to detect a cleaning cassette identification hole formed in the cassette, where it may be judged whether or not the loaded recording medium is a cleaning cassette based on the result of detection of the cleaning cassette identification hole by the hole detecting mechanism. When the recording medium is judged to be a cleaning cassette, a mode of operation in which the cleaning cassette is used is done, while when the recording medium is judged not to be any cleaning cassette, the memory reading means reads the data format identification information from the memory and it may be judged whether the memory is, one provided with terminals for transfer of information signal or one provided with a transmitting and reception means for non-contact transfer of an information signal.

According lo another aspect of the present invention, the tape drive may be adapted such that when the data format identification information cannot be read from the memory, the data format identification information is read from the magnetic tape; when system log allocation flags included in the data format identification information read from the magnetic tape show that the data format identification information is recorded in the magnetic tape, it is judged based on a native flag included in the data format identification information read from the magnetic tape which format the area of the recording medium where the information signal is recorded has, a one in which the area is divided in three or more partitions or a one in which the area is divided in two or less partitions. When it is judged that the area of the magnetic tape in which the information signal is recorded has a format in which the area is divided in three or more partitions, the memory is regarded as being faulty and the magnetic tape is used as a read-only one with prevention of the information signal from being written to the magnetic tape, while when it is judged that the magnetic tape area in which the information signal is recorded has a format in which the area is divided in two or less partitions, the recording medium is regarded as not provided with the memory.

According to another aspect of the present invention, the tape drive may further include:

a hole detecting mechanism for detecting whether or not a write protect hole indicating the prevention of writing of the information signal is formed in the cassette; and a stripe sensor for optically detecting an identification stripe formed on the magnetic tape; so that:

when the data format identification information cannot be read from the memory and also reading of the data format identification information from the magnetic tape is impossible, it is judged, based on the result of write protect hole detection, Woks whether writing of the information signal is prevented or not;

when it is judged that writing of the information signal is not prevented, the magnetic tape is judged to have the format in which the area of the magnetic tape where the information signal is recorded is divided in two or less partitions;

when it is judged that write of the information signal is prevented, the identification stripe is detected by the stripe sensor; when the identification stripe is not detected, it is judged that the memory is not provided and the area of the magnetic tape where the information signal is recorded has the format in which the area is divided in two or less partitions; and when the identification stripe is detected, reading of the data identification information from the magnetic tape is tried.

According to another aspect of the present invention, the tape drive may be adapted such that when it is judged that the memory is not provided and the area of the magnetic tape where the information signal is recorded has the format in which the area is divided in two or less partitions, the magnetic tape being coped with as a blank tape in which information signal is not yet recorded.

Also the above object can be attained by providing a recording medium type identifying method for identification of a data format of a recording medium to and/or from which an information signal is going to be written and/or from and which comprises a magnetic tape; a cassette encasing the magnetic tape; and a memory provided in the cassette to store management information for management of data written to or read from the magnetic tape; the magnetic tape having a data format for data written to or read from the magnetic tape and which corresponds to any of a plurality of predetermined data formats; and the memory having set therein a storage area for storage of data format identification information indicative of the corresponding data format; the method including, according to the present invention, steps of:

reading at least the data format identification information from the management information stored in the memory in the recording medium used; and identifying, based on the data format identification information read by the memory reading means, a data format the loaded recording medium has.

According to another aspect of the present invention, the method may further include a step of detecting whether or not a cleaning cassette identification hole is formed in the cassette of the recording medium; when it is judged based on the result of detection of the cleaning cassette identification hole whether the recording medium used is a cleaning cassette or not; when it is judged that the recording medium used is not any cleaning cassette, the data format identification information is read from the memory and it being judged whether which the memory is, a one provided with terminals for transfer of an information signal or a one provided with a transmitting and reception means for non-contact transfer of the information signal.

According to another aspect of the present invention, the method may be adapted such that when the data format identification information cannot be read from the memory, the data format identification information is read from the magnetic tape; when system log allocation flags included in the data format identification information read from the magnetic tape show that the data format identification information is recorded in the magnetic tape, it is judged based on a native flag included in the data format identification information read from the magnetic tape which format the area of the recording medium where information is recorded has, a one in which the area is divided in three or more partitions or a one in which the area is divided in two or less partitions;

when it is judged that the area of the magnetic tape in which the information signal is recorded has a format in which the area is divided in three or more partitions, the memory is regarded as is faulty and the magnetic tape being used as a read-only one with prevention of the information signal from being written to the magnetic tape; and when it is judged that the magnetic tape area in which the information signal is recorded has a format in which the area is divided in two or less partitions, the recording medium is regarded as not provided with the memory.

According to another aspect of the present invention, the method may be adapted such that when the data format identification information cannot be read from the memory and also reading of the data format identification information from the magnetic tape is impossible, it is judged, based on the result of write protect hole detection, whether writing of the information signal is prevented or not;

when it is judged that writing of the information signal is not prevented, the magnetic tape is judged to have the format in which the area of the magnetic tape where the information signal is recorded is divided in two or less partitions; and when it is judged that write of the information signal is prevented, the identification stripe is detected by the stripe sensor; when the identification stripe is not detected, it is judged that the memory is not provided and the area of the magnetic tape where the information signal is recorded has the format in which the area is divided in two or less partitions; and when the identification stripe is detected, reading of the data identification information from the magnetic tape is tried.

According to another aspect of the present invention, the method may be adapted such that when it is judged that the memory is not provided and the area of the magnetic tape where the information signal is recorded has the format in which the area is divided in two or less partitions, the magnetic tape is judged to be a blank tape in which the information signal is not yet recorded.

BRIEF DESCRIPTION OF THE DRAWINGS

FIG. 4A shows a data structure recorded in the magnetic tape in the tape cassette.

FIG. 4B shows the inside of a partition in the data structure recorded in the magnetic tape in the tape cassette.

FIG. 4C shows the inside of a group in the data structure recorded in the magnetic tape in the tape cassette.

FIG. 4D shows the inside of a frame in the data structure recorded in the magnetic tape in the tape cassette.

FIG. 9 shows the manufacture part in the MIC of the tape cassette.

FIG. 10 shows the definition of the MIC type in the tape cassette.

FIG. 11 shows the drive initialize part in the MIC of the tape cassette.

FIG. 13 shows the volume tag in the MIC of the tape cassette.

FIG. 16 shows the system log allocation flag showing that the system log is in the MIC of the tape cassette.

FIG. 17 shows the definition of AIT native flag in the tape cassette.

FIG. 18A shows the cell structure of the MIC of the tape cassette.

FIG. 18B shows the link information in the MIC of the tape cassette.

FIG. 19 shows the partition information cell in the MIC of the tape cassette.

FIG. 20 shows the partition information in the MIC of the tape cassette.

BEST MODE FOR CARRYING OUT THE INVENTION

Figure 1:
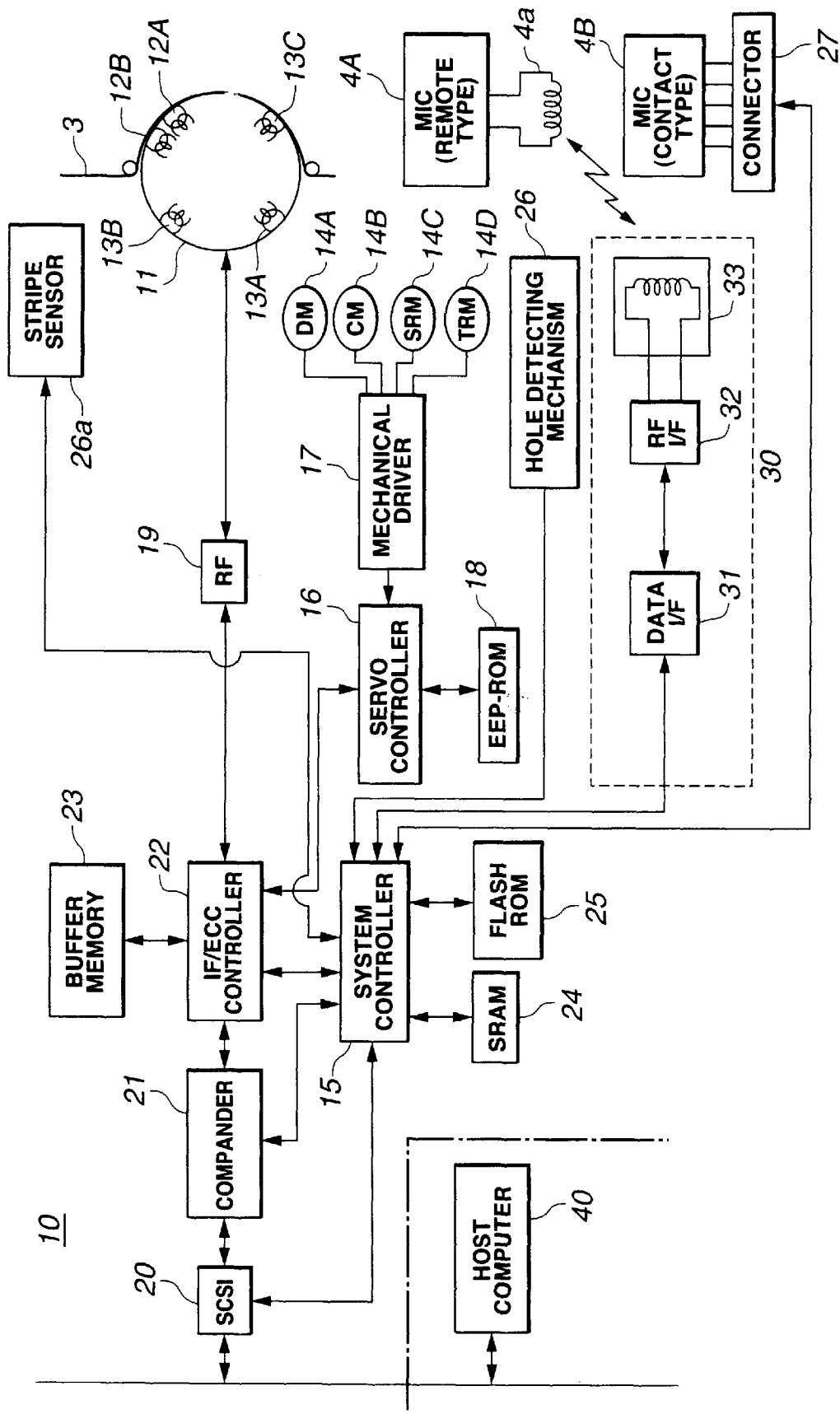
FIG. 1 is a block diagram of a tape streaming drive which is the tape drive according to the present invention.

The present invention will further be described below concerning the embodiments of the present invention with reference to the accompanying drawings.

The embodiments going to be described herein are applications of the present invention to a tape cassette provided with a memory and a data storage system in which the tape cassette with the memory can be used, respectively. The tape cassette provided with the memory and the data storage system, according to the present invention, correspond to the tape cassette provided with a nonvolatile memory and tape drive forming a data storage system capable of writing and/or reading digital data to and/or from the tape cassette with the memory, both having already been proposed by the Application of the present invention. The nonvolatile memory provided in the tape cassette will be referred to as "MIC (memory in cassette)" hereinafter.

The present invention will be described herein in the following order:

1. Construction of tape cassette
2. Construction of tape streaming drive
3. Data structure on magnetic tape
4. Data structure in MIC
5. Structure of tape cassette, which supports data format
   5-1. Identification holes in tape cassette body
   5-2. Magnetic tape identification stripe
6. Construction of tape streaming drive, which supports data format
7. Operations to identify data format
1. Construction of tape cassette First, the tape cassette being a recording medium used in the tape streaming drive or library device according to the present invention will be described with reference to FIGS. 2A, 2B and 3.

Figure 2A:
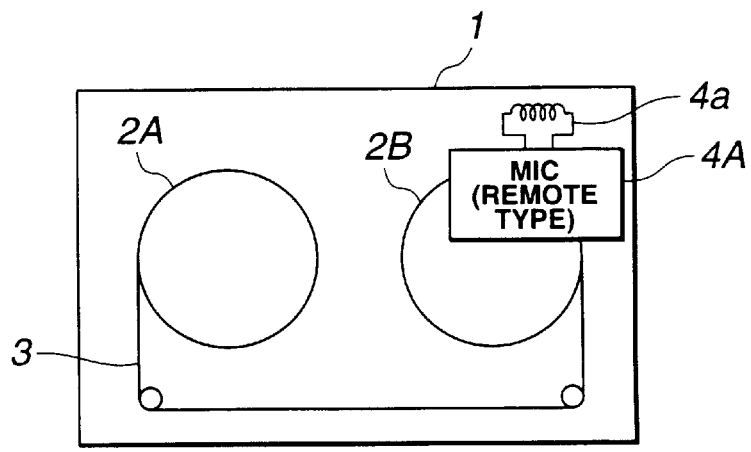
FIG. 2A schematically shows the internal structure of a tape cassette (having a remote type MIC) which is the recording medium according to the present invention.

FIG. 2A shows the concept of the internal structure of the tape cassette provided with an MIC (remote type MIC) as a memory chip. As shown, a cassette 1 has a pair of reels 2A and 2B provided therein. A magnetic tape 3 of 8 mm in width is wound on, and extends between, the reels 2A and 2B.

As shown, the cassette 1 has provided therein a remote type MIC 4A incorporating a nonvolatile memory and a control circuit for the memory. The remote type MIC 4A can make mutual communications of data signals, etc. with a remote memory interface 30 in the tape streaming drive or library device as will further be described later. The remote type MIC 4A is provided with an antenna 4a for the data transmission.

The remote type MIC 4A stores manufacture information and serial number information on each tape cassette, a thickness, length and material of the magnetic tape, history of use of recorded data in each partition, user information, etc., as will further be described later.

The above-mentioned various kinds of information stored in the remote type MIC 4A will also be referred collectively to as "management information" hereinafter since they are used mainly to manage the data written or read to or from the magnetic tape 3 in various manners.

The tape cassette has provided in the body thereof the nonvolatile memory in which management information is stored and the tape streaming drive for that tape cassette has the interface for data written and read to or from the nonvolatile memory. Thus, by writing or reading to or from the nonvolatile memory the management information on the data written to or read from a magnetic tape in the tape cassette, data can efficiently be written to or read from the magnetic tape 3.

For example, the tape cassette can be loaded into or unloaded from the tape streaming drive even with the magnetic tape being stopped in the mid way. For loading or unloading of the tape cassette, it is not necessary to rewind the magnetic tape to its leading end for example. Also, data can be edited by rewriting the management information in the nonvolatile memory. Moreover, more partitions can be set on the magnetic tape for more appropriate management of the data write and/or read operations.

Figure 2B:
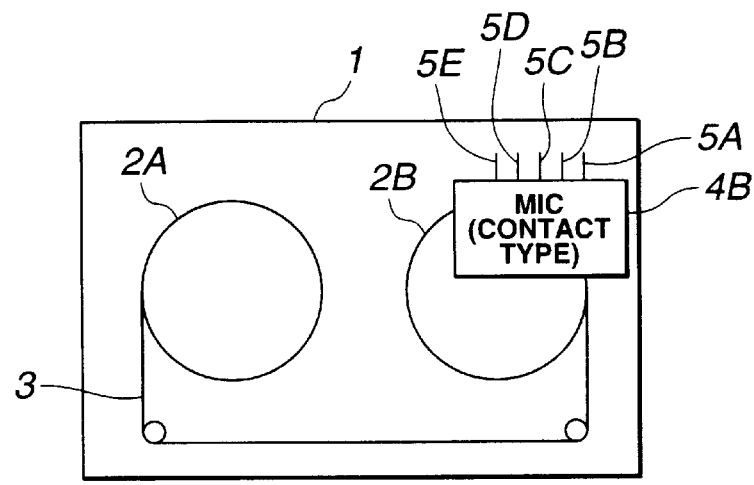
FIG. 2B schematically shows the internal structure of a tape cassette (having a contact type MIC) which is also the recording medium according to the present invention.

FIG. 2B shows a tape cassette incorporating a contact type MIC (nonvolatile memory) 4B.

In this embodiment, five terminals 5A, 5B, 5C, 5D and 5E are led out from the module of the contact type MIC 4B. These five terminals are used as a power terminal, data input terminal, clock input terminal, grounding terminal and an auxiliary terminal, respectively.

The contact type MIC 4B stores similar information to that stored in the remote type MIC 4A as the remote memory chip.

Figure 3:
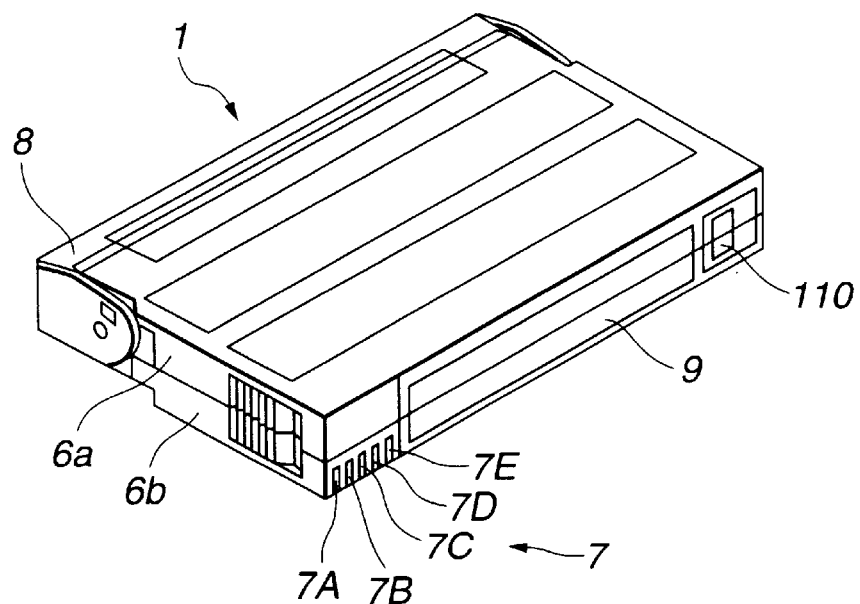
FIG. 3 is a perspective view of the tape cassette.

FIG. 3 is an external view of the tape cassette shown in FIG. 2A or 2B. The entire cassette body consists of an upper case 6a, lower case 6b and a guard panel 8. This construction is basically similar to that of a tape cassette which is used in a common so-called "8-mm VTR".

A terminal block 7 is provided near a label surface 9 at the lateral side of the tape cassette.

Further, on the tape cassette incorporating the contact type MIC 4B shown in FIG. 2B, terminal pins 7A, 7B, 7C, 7D and 7E are provided at positions corresponding to those of the electrodes, respectively, and connected to the terminals 5A, 5B, 5C, 5D and 5E, respectively, shown in FIG. 2B) That is, with the terminal pins 7A, 7B, 7C, 7D and 7E put in physical connection to the tape streaming drive 10 which will further be described later, the tape cassette having the contact type MIC 4 (4B) can make mutual communications of data signals, etc. with the tape streaming drive 10 via the terminal pins 7A, 7B, 7C, 7D and 7E.

On the other hand, the terminal pins are of course unnecessary for the tape cassette having the remote (non-contact) type memory chip provided therein as MIC as shown in FIG. 2A. However, this tape cassette has the appearance as shown in FIG. 3. Namely, to assure the same shape as that of the tape cassette shown in FIG. 2B, the terminal pins 7A to 7E are provided also on the tape cassette in FIG. 2A but they are dummy ones so that this tape cassette can also be played in the tape streaming drive.

Note that in the following description, when the remote type MIC 4A and contact type MIC 4B are collectively referred to herein or where it is not necessary to make any discrimination between the remote type MIC 4A and contact type MIC 4B in description of them, they will be referred to simply as MIC4.

2. Construction of tape streaming drive

Next, the tape streaming drive being the embodiment of the present invention will be described herein with reference to FIG. 1. The tape streaming drive is generally indicated with a reference 10 and adapted to make write or read information signal to or from the magnetic tape 3 in the aforementioned tape cassette by the helical scan method.

As shown in FIG. 1, there is provided a rotary drum 11 having two write heads 12A and 12B and three read heads 13A, 13B and 13C for example.

The write heads 12A and 12B have their respective gaps different in azimuth angle from each other which are laid in close vicinity of each other. The read heads 13A and 13B are different in azimuth angle from each other and disposed at 90 deg. for example in relation to each other.

The rotary drum 11 is rotatable by a drum motor 14A, and has wounded thereon the magnetic tape 3 led out of the tape cassette.

The magnetic tape 3 is moved by a capstan motor 14B and pinch rollers (not shown). As mentioned above, the magnetic tape 3 is wound on the reels 2A and 2B. The reels 2A and 2B are rotated by reel motors 14C and 14D, respectively, in the forward and backward directions, respectively.

The drum motor 14A, capstan motor 14B, and the reel motors 14C and 14D are supplied each with a power from a mechanical driver 17. The mechanical driver 17 drives each of the motors under the control of a servo controller 16. The servo controller 16 controls the speed of each motor to move the magnetic tape for ordinary recording and reproduction, high speed reproduction, fast forwarding and for rewinding.

There is provided an EEP-ROM 18 having stored therein constants the servo controller 16 uses for servo control of each of the motors.

The servo controller 16 is bidirectionally connected to a system controller 15 via an interface controller/ECC formatter 22 (will be referred to as "IF/ECC controller" hereinafter). The system controller 15 controls the entire system of the tape streaming drive.

There is also provided a hole detecting mechanism 26 to detect each of identification holes formed in the tape cassette loaded in the tape streaming drive. The hole detecting mechanism 26 is composed of pins corresponding to the identification holes, photosensors, etc. for example.

The tape cassette has formed therein various identification holes which are to be closed and opened depending upon the type of a tape contained in the tape cassette and whether or not the write protect function is applied, in compliance with a predetermined standard. The hole detecting mechanism 26 detects such holes.

Detection information from the hole detecting mechanism 26 is supplied to the system controller 15 which can know the type of the tape in the tape cassette and whether or not the write protection function is applied.

The identification holes formed in the tape cassette according to the present invention will further be described later.

Also there is provided a stripe sensor 26a to detect an identification stripe formed on the leader tape in the tape cassette based on a predetermined data format applied to the tape cassette. The identification stripe is detected by the stripe sensor 26a will further be described later.

The tape streaming drive 10 uses an SCSI interface 20 for data input and output. For data recording for example, data are sequentially supplied in fixed-length records from a host computer 40 to a compander (compressor/expander) 21 via the SCSI interface 20. For the tape streaming drive of this type, there is available a mode in which data are transmitted in data aggregates from the host computer 40.

The compander 21 compresses the supplied data by a predetermined method if necessary. In a compression method using LZ code for example, a dedicated code is assigned to a character string having been processed in the past, and cumulatively stored in the form of a dictionary. A subsequently entered character string is compared with the content of the dictionary. When the comparison result shows that the input character string coincides with the code in the dictionary, the input character string is replaced with the code in the dictionary. If the comparison result does not show that the input character string coincides with the code in the dictionary, a new code is assigned to the input character string and registered into the dictionary. Data in input character strings is thus registered and the character string data is replaced with the code in the dictionary, thereby compressing the data.

The output of the compander 21 is supplied to the IF/ECC controller 22, and stored once into a buffer memory 23 under the control of the EF/ECC controller 22. The data stored in the buffer memory 23 are finally treated in groups each of which has a fixed length equal to 40 tracks on the magnetic tape 40. The data is ECC-formatted.

In the ECC formatting, an error correction code is appended to a to-be-recorded data and the data is modulated for magnetic recording, and then the modulated data into supplied to an RF processor 19.

Note that in the embodiment of the present invention, there is available a plurality of data formats for data which is to be written to or read from the magnetic tape. In this embodiment, the data formats will collectively be referred as "AIT (advance intelligent tape)".

The tape streaming drive 10 according to the present invention is adapted to support two AIT formats, one being an AIT-1 and the other being AIT-2 which is an extended version of AIT-1.

Note also that the tape cassette according to the present invention is basically adapted to support AIT-1 or AIT-2. Actually, the tape cassettes adapted to support these AIT formats according to the present invention basically include ones provided with MIC 4, but some of the tape cassettes are not provided with MIC 4.

The RF processor 19 amplifies, equalizes and processes otherwise the supplied to-be-recorded data to generate a recording signal for supply to the write heads 12A and 12B. Thus, the write heads 12A and 12B write the data to the magnetic tape 3.

The data read will be outlined herebelow. Recorded data is read from the magnetic tape 3 by the read heads 13A and 13B as RF read signal. Outputs from the read heads 13A and 13B are equalized, processed to generate a clock, binary-coded, and decoded (Viterbi-decoded, for example) in the RF processor 19.

The signal thus read is supplied to the IF/ECC controller 22 where it is error-corrected first of all. The error-corrected signal is provisionally stored in the buffer memory 23. It will be read at a predetermined time and supplied to the compander 21.

The read signal will be expanded by the compander 21 if it is judged by the system controller 15 to be data having been compressed by the compander 21 when it was written. If it is judged not to be compressed, it will be passed and provided as an output without being expanded.

The data output from the compander 21 is provided as a read data to the host computer 25 (40) via the SCSI interface 20.

Also in FIG. 1, there are shown both the remote type MIC 4A and contact type MIC 4B as MIC 4 each provided in the tape cassette. Actually, however, a tape cassette provided with MIC has either the remote type MIC 4A or contact type MIC 4B is provided therein.

When a tape cassette provided with the remote type MIC 4A is inserted into the tape streaming drive, data can be transferred between the remote type MIC 4A and system controller 15 via a remote memory interface 30 in a contactless manner.

The remote memory interface 30 includes a data interface 31, RF interface 32 and an antenna 33.

The remote memory interface 30 functions as will be outlined below:

The data interface 31 is a means via which data is transferred between the remote type MIC 4A and system controller 15 as mentioned above. Data is transferred to the remote type MIC 4A by transmitting a command from the tape streaming drive and returning an acknowledge from the remote type MIC 4A upon reception of the command. A command issued to the remote type MIC 4A from the system controller 15 is received by the data interface 31, and supplied to the RF interface 32. The data interface 31 supplies a carrier frequency (13 MHZ) to the RF interface 32.

The RF interface 32 will modulate the amplitude of a command signal (100 kHz) and superpose it on the carrier frequency, and amplify the modulated signal. The amplified modulated signal is provided to the antenna 33. Thus, the command data is wirelessly transmitted from the antenna 33 to the antenna 4a in the tape cassette 1. The tape cassette is powered by receiving the command data by the antenna 4a and the system controller 15 provided in the remote type MIC 4A will operate in a predetermined manner according to the command. For example, data transmitted along with the write command is written into the EEP-ROM 18.

When a command is issued from the remote memory interface 30 as in the above, the remote type MIC 4A will issue a corresponding acknowledge and transmit it from the antenna 4a.

When the acknowledge is received by the antenna 33, it will be rectified in the RF interface 32 and then demodulated as a binary-coded data by passing it through a comparator, for example. The binary data is supplied from the data interface 31 to the system controller 15. When a read command is issued from the system controller 15 to the remote type MIC 4A for example, the latter will send data from its internal memory element along with a code as an acknowledge corresponding to the read command. Then, the acknowledge code and read data are received and modulated by the remote memory interface 30, and supplied to the system controller 15.

As in the above, the tape streaming drive 10 is able to access the remote memory chip (MIC) 4 in the tape cassette 1 via the remote memory interface 30.

Note that for the non-contact data exchange, data is superposed on a 13-MHZ carrier frequency by 100-kHz amplitude modulation while its initial data is packeted.

That is, data as command and acknowledge are packeted by appending thereto header, parity and other necessary information, and the packet is code-converted before being modulated, thereby transmitting and receiving the data as a stable RF signal.

Note that the technique to implement the aforementioned non-contact interface has been proposed by the Applicant of the present invention and patented as the Japanese Patent No. 2550931.

On the contrary, when the tape cassette provided with the contact type MIC 4B is inserted into the tape streaming drive 10, the terminals 7A to 7E shown in FIG. 3 are put into contact with a connector 27 of the tape streaming drive 10 to provide an electrical connection between them for data transfer between the tape cassette side and system controller 15. Thus, the system controller 15 can read and update management information recorded in the contact type MIC 4B.

Information is transferred between the tape streaming drive 10 and host computer 40 via the SCSI interface 20 as in the above. The host computer 40 will use SCSI commands to make a variety of communications with the system computer 15.

Therefore, the host computer 40 can issue SCSI commands to have the system controller 15 effect data written to or read from MIC 4.

Further there are provided an S-RAM 24 and flash ROM 25 in which there are stored data used by the system controller 15 to do a variety of operations.

For example, the flash ROM 25 stores constants used in controlling. The S-RAM 24 is used as a work memory and a memory to store and process data read from MIC 4, data for written into MIC 4, mode data set for each tape cassette and various flag data.

The S-RAM 24 and flash ROM 25 may be adapted as internal memories in a micro computer forming the system controller 15, and a partial area of the buffer memory 23 may be adapted to function as a work memory.

The above mode set for each tape cassette is a one set depending upon a format in which the magnetic tape in the tape cassette has been initialized. It is either a normal mode or a multi-partition mode. In other words, these modes refer to tape formats in which the magnetic tape is initialized.

The normal mode is used to format the tape cassette in one partition or two partitions. On the other hand, the multi-partition mode is used to format the tape cassette in three or more partitions.

Also when the tape cassette is formatted in the multi-partition mode, it can be loaded or unloaded even while data is yet being written to or read from any of the partitions (namely, even when the magnetic tape has not been returned to the leading end or trailing end).

The above mode setting or tape formatting is done by the tape streaming drive 10 for a tape cassette having not yet been set to any mode or a tape cassette which should desirably be initialize for the purpose of mode change. When a tape cassette which is not set in any of the above modes is loaded in the tape streaming drive 10, it will be judged to which tape format the tape cassette has been set, and the system controller 15 will set the tape streaming drive for operation in the mode to which the tape cassette has been set.

When the tape cassette loaded in the tape streaming drive is a one provided with the above-mentioned MIC, either the multi-partition or normal mode can freely be selected. If the tape cassette is a one with no MIC, only the normal mode can be selected.

3. Data structure on magnetic tape

The data format on the magnetic tape 3 in the tape cassette to or from which data is written or read by the aforementioned tape streaming drive 10 will be outlined below:

FIGS. 4A, 4B, 4C and 4D show the structure of data recorded on the magnetic tape 3. FIG. 4A schematically shows one magnetic tape 3. According to the present invention, the single magnetic tape 3 can be divided in units of a partition for practical use as shown. In the tape streaming drive 10 according to the present invention, a single magnetic tape can be divided into a maximum of 256 partitions for the purpose of data write or read management. As shown in FIGS. 4A, 4B, 4C and 4D, the partitions are assigned numbers #0, #1, #2, #3, . . . with which the partition are managed.

Therefore, according to the present invention, it is possible to write or read data independently to or from each of the partitions on the magnetic tape. As shown in FIG. 4B, each of the partitions can be divided into fixed-length units called "group" as shown in FIG. 4C. Recording is made to each group in each of the partitions on the magnetic tape 3.

In this case, one group consists of 20 frames, and one frame consists of two tracks as shown in FIG. 4D. Namely, the two tracks in one frame are adjacent to each other and have a positive azimuth and negative azimuth, respectively. Therefore, one group is formed from 40 tracks.

Figure 5A:
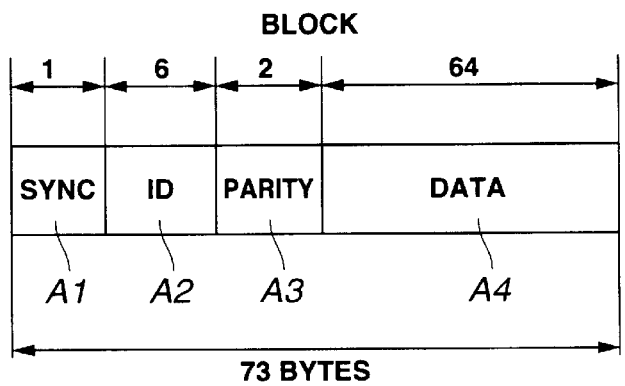
FIG. 5A schematically shows the data structure of one block in a data structure recorded in the magnetic tape.
Figure 5B:
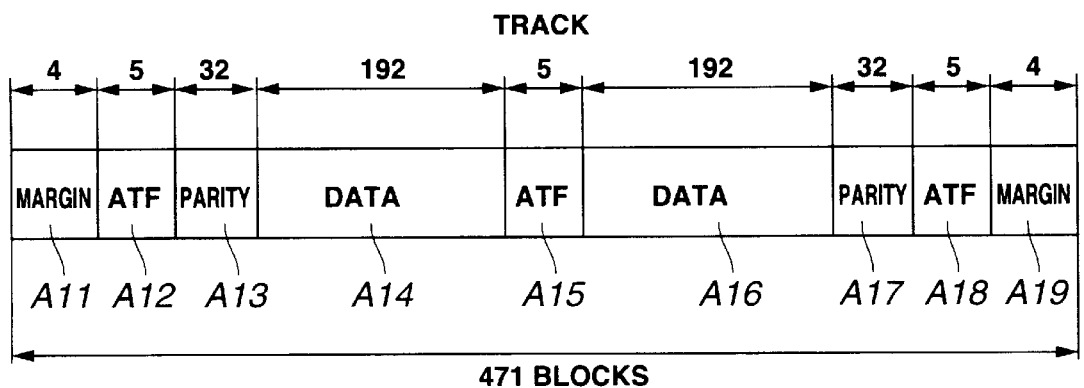
FIG. 5B schematically shows the data structure of one track in a data structure recorded in the magnetic tape.

The data structure on one track shown in FIG. 4D is shown in further detail in FIGS. 5A and 5B. FIG. 5A shows the data structure in one block formed from a one-byte sync data area A1, 6-byte ID area A2 for used in searching, 2-byte error correction parity area A3 for ID data, and a 64-byte data area A4.

As shown in FIG. 5B, data. in one track consists of a total of 471 blocks. Also as shown in FIG. 5B, one track has margin areas A11 and A19 for 4 blocks at opposite ends thereof. An ATF area A12 is defined after the margin area A11 and another ATF area A18 is defined before the margin area A19. Further, the ATF area A12 is followed by a parity error area A13 and a parity error area A17 is defined before the ATF area A18. Each of these parity error areas A13 and A17 includes 32 blocks.

An ATF area A15 is provided in the middle of one track. Each of these ATF areas A12, A15 and A18 includes 5 blocks. Further, a 192-block data area A14 is provided between the parity area A13 and ATF area A15, and another 192-block data area A16 is provided between the ATF area A15 and parity area A17. Therefore, the data areas A14 and A16 in one track share 384 blocks (192×2) of the total of 471 blocks.

Figure 5C:
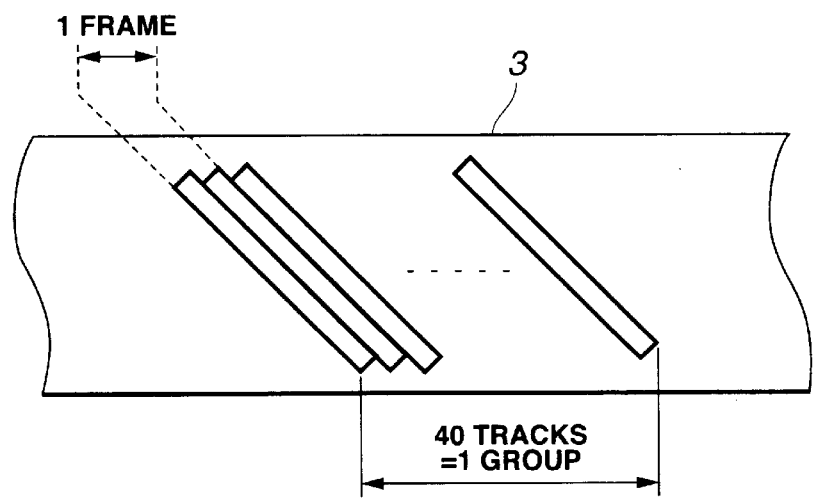
FIG. 5C schematically shows the data structure of one frame in a data structure recorded in the magnetic tape.

Thus, the tracks are physically recorded on the magnetic tape 3 as shown in FIG. 5C, and 40 tracks (=20 frames) will be taken as one group as in the above.

In the magnetic tape 3 having been described in the above with reference to FIGS. 4A, 4B, 4C and 4D and FIGS. 5A, 5B and 5C, data will be recorded in an area structure as will be described below with reference to FIGS. 6A, 6B and 6C.

Note that in an example which will be described herein, the magnetic tape is set to have N partitions #0, . . . , #N-1.

Figure 6A:
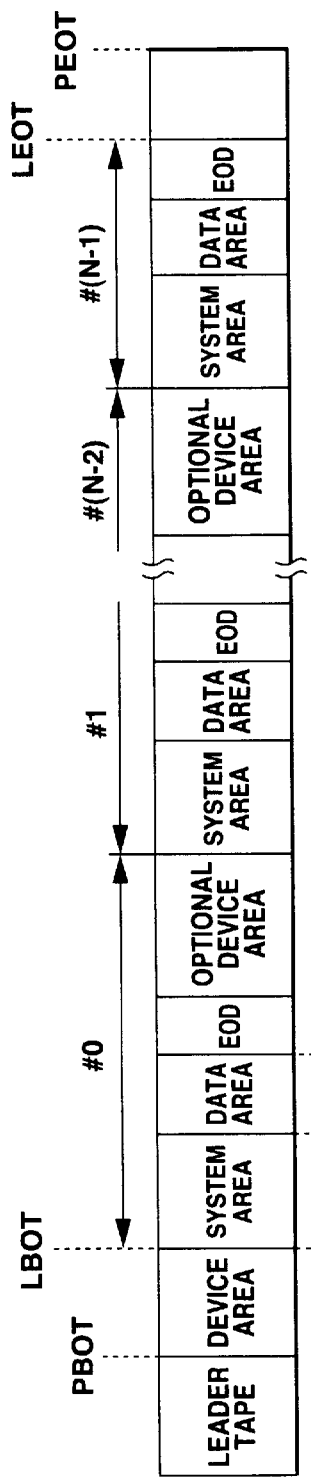
FIG. 6A shows the construction of an area on the magnetic tape.

As shown in FIG. 6A, the magnetic tape physically consists of a leader tape at the beginning (top) thereof, which is followed by a device area for allowing to load or unload the tape cassette. The top of this device area is taken as a physical beginning of tape (PBOT).

The device area is followed by a reference area for the partition #0 and system area in which history of use of the magnetic tape is stored (these reference and system areas will collectively be referred to as "system area" hereinafter). The device area is further followed by a data area. The top of the system area is taken as a logical beginning of tape (LBOT).

Figure 6B:
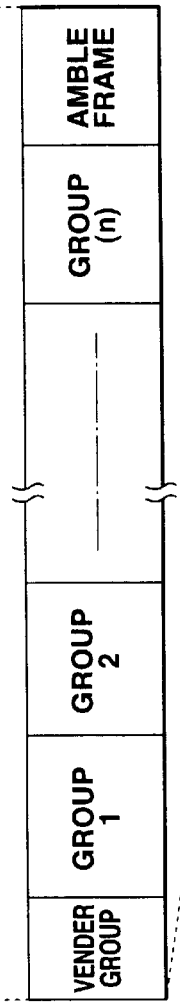
FIG. 6B shows the construction of a data area on the magnetic tape.
Figure 6C:
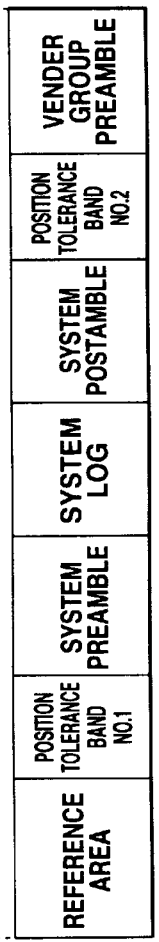
FIG. 6C shows the construction of a system area on the magnetic tape.

As shown enlarged in scale in FIG. 6C, the system area includes a reference area, position tolerance band No. 1, system preamble, system log, system postamble, position tolerance band No. 2, and a vender group preamble.

According to this embodiment, it is defined that there should be recorded in the system log area information having the nearly same content as management information which is stored in MIC 4, as will be described later.

As shown enlarged in scale in FIG. 6B, the data area following the system area includes a vender group indicative of information on a vender who first generates and supplies data, and a plurality of successive groups indicated with references 1 to (n) and which have already been shown in FIG. 4C. Finally an amble group is provided following the last group (n).

As shown in FIG. 6A, the data area is further followed by an end of data (EOD) area indicative of the end of data area in the partition.

When only one partition is formed on the magnetic tape, the end of the EOD of the partition #0 will be taken as a logical end of tape (LEOT) of the magnetic tape. In this example, however, since the N partitions are formed on the magnetic tape, the EOD of the partition #0 is followed by an optional device area.

The device area ranging from the above-mentioned top position PBOT is intended for tape cassette loading and/or unloading corresponding to the partition #0, and the last optional device area in the partition #0 is intended for tape cassette loading and/or unloading corresponding-to the partition #1.

The partition #1 consists of areas as in the partition #0, and it ends in an optional device area intended for tape cassette loading or loading corresponding to a next partition #2.

The subsequent partitions down to #(N-1) have a similar structure to the above.

Note that the last partition #(N-1) has no optional device area because the latter is not required but its EOD ends in a logical end of tape (LEOT).

PEOT stands for physical end of tape. Namely, it indicates the physical end of the magnetic tape or physical end of the partition.

As having also been described, the tape is formatted in either the normal or multi-partition mode in this embodiment. The tape layout will be described herein concerning each of the normal mode (DDS mode) and multi-partition mode with reference to FIGS. 7A, 7B and 7C.

Figure 7A:
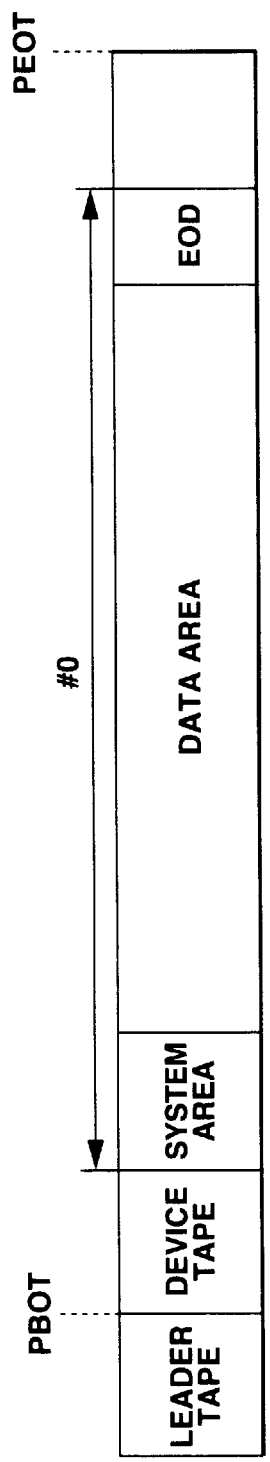
FIG. 7A shows a tape layout on the magnetic tape when in the normal mode (one-partition mode).

FIG. 7A shows an example that the magnetic tape is formatted in the normal mode to have one partition.

In this case, only the partition #0 is formed to have a structure similar to that of the last partition #(N-1) shown in FIGS. 6A, 6B and 6C for example. That is, the partition #0 in this example has no optional device area at the trailing end thereof.

Figure 7B:
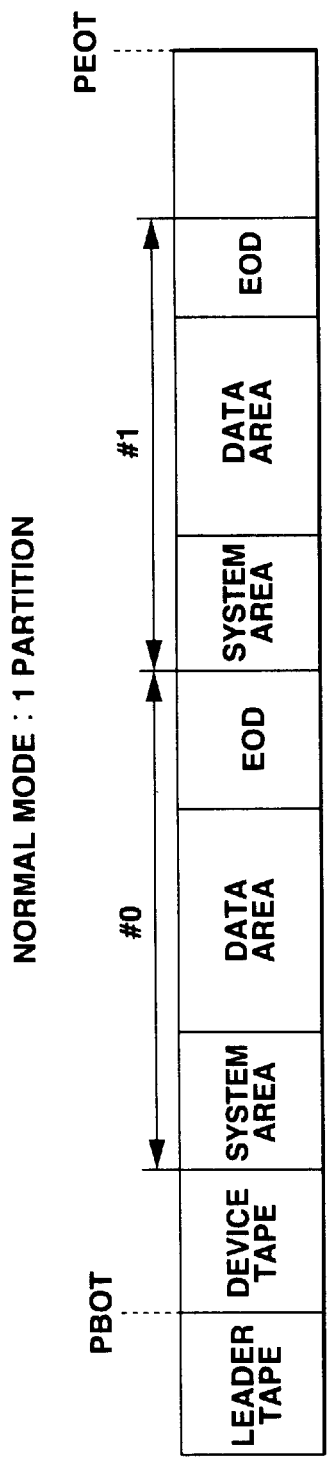
FIG. 7B shows a tape layout on the magnetic tape when in the normal mode (two-partition mode).

FIG. 7B shows an example that the magnetic tape is formatted in the normal mode to have two partitions, namely, partitions #1 and #0, as shown. In case two partitions are provided in the normal mode, however, the partition #1 is disposed at the leading end of the magnetic tape.while the partition #0 is provided after the partition #1.

The tape formatting in the normal mode shown in FIGS. 7A and 7B can be done with any of tape cassettes with and without MIC 4, respectively.

Figure 7C:
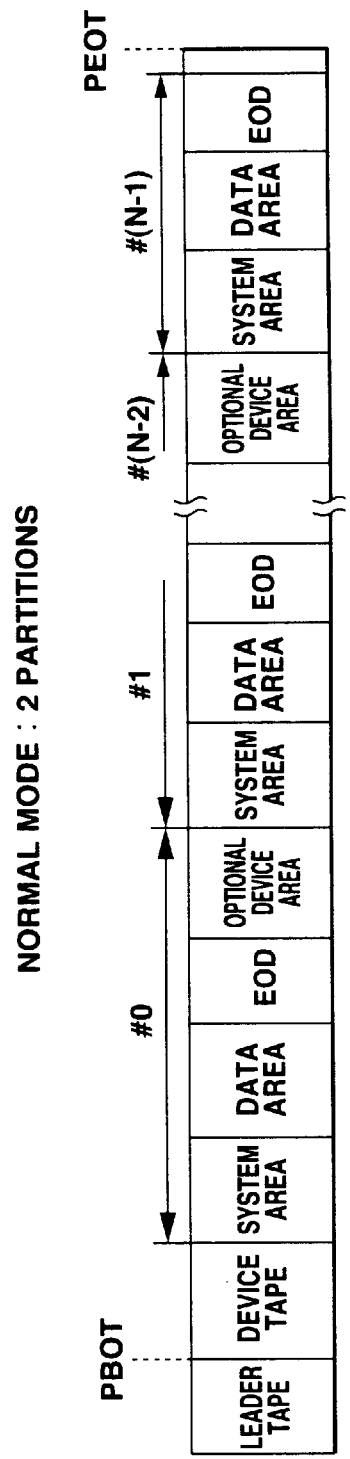
FIG. 7C shows a tape layout in the magnetic tape when in the multi-partition mode.

FIG. 7C shows an example that the magnetic tape is formatted in the multi-partition mode to have a plurality of partitions #0 to #(N−1).

It is required according to the standard that when the multi-partition mode is applied for tape formatting, the magnetic tape should be formatted so that the partition #0 is at the topmost position of the magnetic tape, followed by the partition #1, . . . , partition #(N−2) and the partition #(N−1). Each of the partitions will be provided with an optional device area at the trailing end thereof in addition to the areas having been described with reference to FIGS. 5A, 5B and 5C. That is, the tape layout is the same as shown in FIG. 6A.

As having been described in the foregoing, the device area near the beginning end of the tape is for tape loading or unloading. The optional device area is provided to allow the tape loading or unloading at each partition (namely, when the tape is not at the leading or trailing end).

The tape layout in the multi-partition mode as shown in FIG. 7C can be realized only with a tape cassette provided with MIC 4.

The AIT-1 and AIT-2 are available as the data formats for the embodiment of the present invention as having previously been described. Both the data formats AIT-1 and AIT-2 are compatible with both tapes formatted (initialized) in the normal and multi-partition modes.

Note that the normal mode will also be referred herein to as "DDS mode" for the convenience of description.

4. Data structure in MIC

Figure 8:
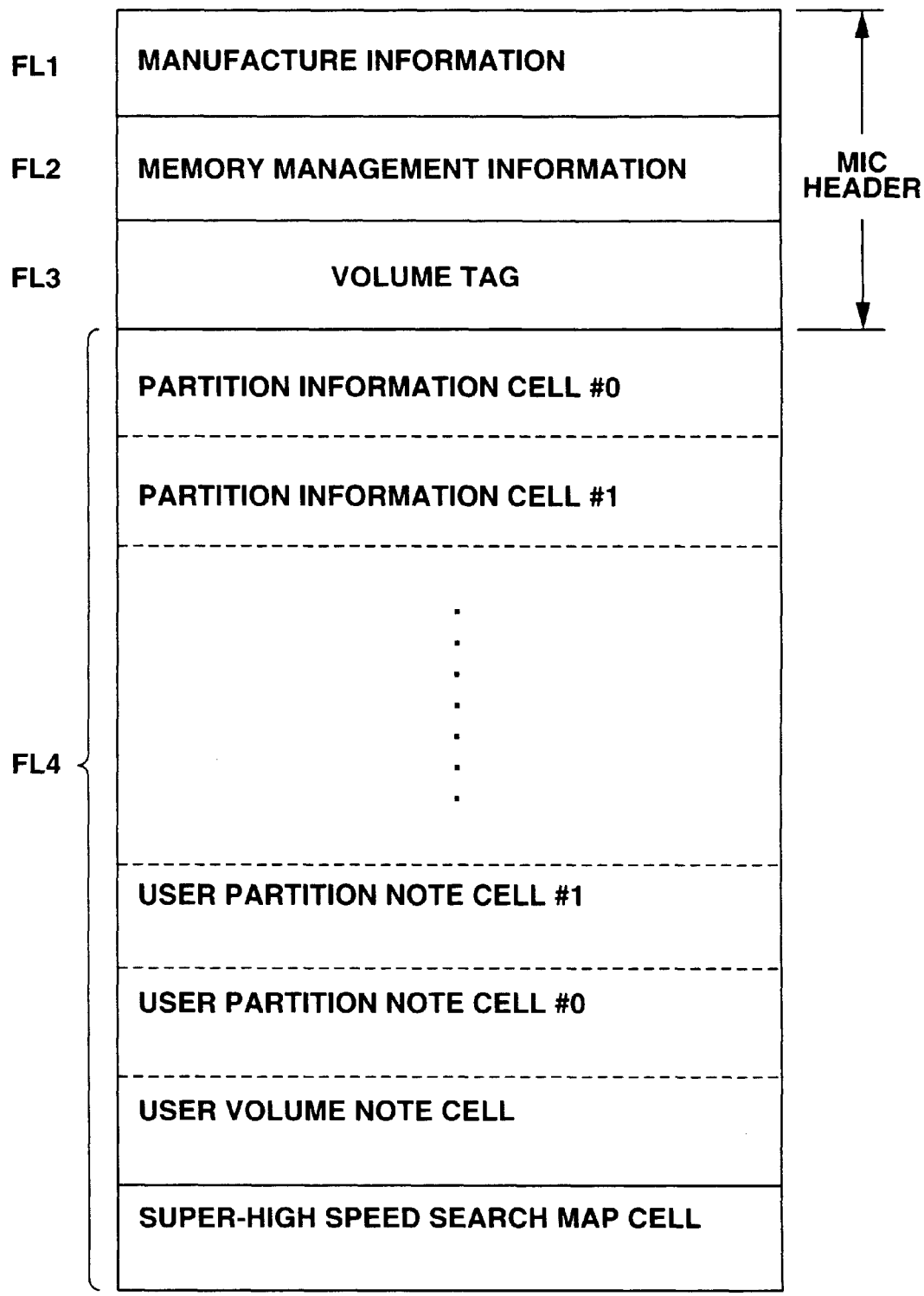
FIG. 8 shows the data structure in the MIC of the tape cassette.

Next, the structure of data stored in MIC 4 provided in the tape cassette 1 will be described herein:

FIG. 8 schematically shows a structure example of data stored in MIC 4. In the storage area of MIC 4, there are set fields FL1 to FL4 as shown in FIG. 8.

A variety of information on the manufacture of the tape cassette, information on the tape initialization and information in each partition are written into these fields FL1 to FL4.

The field FL1 is a manufacture part for storing manufacture information including a variety of information on the manufacture of the tape cassette.

The field FL2 is a drive initialize part for storing memory management information including mainly information on the tape initialization.

The field FL3 is a volume tag part for storing basic management information for the entire tape cassette.

The field FL4 is a memory-free pool area in which management information can additionally be stored. The memory-free pool stores a variety of information correspondingly to the progress of data write or read operation or as necessary. Note that one unit of data group stored in the memory-free pool will be referred to as "cell" hereinafter.

Partition information cells #0, #1, . . . being engagement information corresponding to the partitions, respectively, formed on the magnetic tape 3 are sequentially written starting at the top of the memory-free pool. Namely, there are formed as many partition information cells as the partitions formed on the magnetic tape 3.

Also, a super-high speed search map cell as map information for high-speed search is written starting at the trailing end of the memory-free pool.

Next, a user volume note cell and user partition note cell are written in this order toward the top of the storage area of the MIC 4 starting at the end of the super-high speed search map cell. The user volume note cell is information such as a comment entered by the user concerning the entire tape cassette, and the user partition note cell is information such as a comment entered by the user concerning each partition. Therefore, the user volume note cell and user partition note cell are stored when the user gives a write instruction. All the information will not be described.

The intermediate area in which the above information is not stored is left as a memory-free pool into which data is to be written later.

The manufacture information in the field FL1 has a structure as shown in FIG. 9 for example. The size of each data (in bytes) is shown at the left.

The manufacture information includes first a "manufacture part checksum" of one byte. The "manufacture part checksum" is a checksum of manufacture information. The manufacture part checksum is given to each magnetic tape at the time of tape cassette manufacture.

The actual data in the manufacture part includes data ranging from a "MIC type" to "write protected data byte count". Note that in the field FL1, "reserved" indicates an undefined area used as an auxiliary area for future data storage. This is also true for the following description.

The "MIC type" indicates the type of a MIC actually provided in the tape cassette and a data format the tape cassette should support. The definition of the MIC type will further be described later.

The manufacture information in the field FL1 further includes a "MIC manufacture data" indicating the date (and hours) on which the MIC was manufactured.

The manufacture information includes also a "MIC manufacture line name" indicating the name of the manufacture line along which the MIC was manufactured.

The manufacture information includes a "MIC manufacture plant name" indicating the name of the plant where the MIC was manufactured.

Also the manufacturer information includes a "MIC manufacturer name" indicating the name of the manufacturer who manufactured the MIC.

The manufacture information further includes a "MIC name" indicating the name of the vender from whom the MIC was supplied or bought.

Further the manufacture information includes a "cassette manufacture data", "cassette manufacture line name", "cassette manufacture plant name", "cassette manufacture name" and "cassette name", similar to the aforementioned information on the MIC.

The manufacture information also includes an "OEM customer name" indicating the name of the original equipment manufacturer (OEM).

The manufacture information further includes "physical tape characteristic ID" such as tape material, thickness and length.

Also the manufacture information includes a "maximum clock frequency" indicating the maximum clock frequency the MIC can support.

The manufacture information includes a "maximum write cycle" indicating how many bytes of data can be transferred by one communication with the tape streaming drive 10. This information depends upon the physical characteristic of a nonvolatile memory used as the MIC.

The manufacture information also includes a "MIC capacity" indicating the storage capacity of the MIC.

The manufacture information includes a "write protect start address" used to prevent a predetermined part of the MIC from being written, and indicating an address at which the write-protected area starts.

The manufacture information also includes a "write protect byte count" indicating a number of bytes of the write-protected area. That is, an area occupied by the number of bytes specified in the "write protect byte count" area starting at an address specified in the above "write protect start address" will be set as a write-protected area.

FIG. 10 shows the definition of the "MIC type" area shown as a field FL11 in FIG. 9.

The "MIC type" area is of one byte as shown in FIG. 9 as well. In this area, the seventh to fourth bits indicate a data format the tape cassette in consideration can support, and third to 0-th bits indicate a type of the MIC provided in the tape cassette.

When the seventh to fourth bits take a value "0000", the tape cassette can support the AIT-1 format. When these bits take a value "0001", the tape cassette can support the AIT-2 format. When the bits take a value "0010", the tape cassette can support the AIT-3 format. When the bits take a value "0011", the tape cassette can support the AIT-4 format. The areas showing values "0100" to "1111" of these bits are currently reserved.

Therefore, even if a data format AIT-5 or more for example is standardized in future, areas can be reserved for new data formats, to thereby sufficiently support future data formats.

When the four bits, namely, the third to 0-th bits take a value "0001", the contact type MIC 4B with five pin terminals shown in FIG. 2B is provided in the tape cassette. A value "0101" these bits take means that the MIC provided in the tape cassette is the remote type MIC 4A shown in FIG. 2A. At present, only these two values of the third to 0-th bits are defined. The remaining values "0000", "0010" to "0100", "0110" and "1111" are not yet defined.

As having previously been described, only the data formats AIT-1 and AIT-2 are standardized at present. Since the remote type MIC 4A can be provided in a tape cassette which can support the data format AIT-2 in practice, the values indicating the MIC type can only be combinations in value, "xxxx" and "xxxx", of the seventh to fourth bits and third to 0-th bits at present, that is, "0000" and "0001" for AIT-1 and contact type MIC, "0001" and "0001" for AT-2 and remote type MIC, and "0001" and "0101" for AIT-2 and contact type MIC.

The memory management information in the field FL2 in FIG. 8 has a structure which will be described below with reference to FIG. 11. The size of each data (in bytes) is shown at the right.

The memory management information includes first a "drive initialize part checksum" where a checksum of a memory management information in a drive initialize part is store The "drive initialize part checksum" is followed by real data including "MIC logical format type" to "free pool bottom address".

An ID number for the MIC logical type is stored as the "MIC logical format type". The MIC formats include, in addition to the basic MIC format, a firmware update MIC format, reference tape MIC format, cleaning tape cassette MIC format, for example. An ID number corresponding to the MIC format of the tape cassette is stated in this area.

Further to the "MIC logical format type", an "absolute volume map pointer" is included in the memory management information. A pointer indicative of the top address of the "absolute volume map information cell" in FIG. 8 is disposed in this area.

The memory management information further includes a "user volume note cell pointer" which indicates a storage area of the tape cassette to or from which data can freely be written or read by the user via the SCSI interface, that is, a start address of the "user volume note cell" in FIG. 8.

Further to the above, there is provided a "user partition note cell pointer" indicating a storage area of a partition to or from which data can freely be written or read by the user via the SCSI interface, that is, a start address of the "user partition note cell" in FIG. 8. Note that in case there is a plurality of user partition note cells, the user partition note cell pointer indicates a start address of the top one of the plurality of user partition note cells.

The memory management information includes also a "partition information cell pointer" which indicates a start address of the "partition information cell #0" in FIG. 8.

Partition information to be written into the memory free pool will be formed in an number as many as the partitions formed on the magnetic tape 3. All the partitions #0 to #N are concatenated to each other by the pointer owing to a linkage structure. That is, the partition information cell pointer provides a route indicating the address of the partition #0, and each of pointers of subsequent partition information cells are disposed within a partition information cell just before each of the partition information cells.

As in the above, data positions in the field FL4 are managed with the pointers (absolute volume map pointer, user volume note cell pointer, user partition note cell pointer and partition information cell pointer).

The memory management information includes also a "volume attribute flags" of one byte for providing a logical write protect tab to prevent write to the MIC 4. The MIC head flag allows and/or prevents data write to the manufacture part or to other part than the manufacture part.

Further to the "volume attribute flags", a "free pool top address" and "free poll bottom address" areas are included in the memory management information area. They indicate a concurrent start address and end address of the memory free pool in the field FL2. Since the area of the memory free pool varies depending upon the write or erase of the partition information, user partition note, etc., the free pool top address and free pool bottom address are correspondingly updated.

The volume attribute flags area as a field FL 21 in the memory management information shown in FIG. 11 will further be described below with reference to FIG. 12. The volume attribute flags area is of one byte, in which the flags at the first to eighth bits are defined as follows:

The first bit is a "prevent write flag", second bit is a "prevent read flag", third bit is a "prevent write retry flag", and the fourth bit is a "prevent read retry flag". These flags allow and/or prevent write to the entire volume (magnetic tape), read from the entire volume, retry to write data based on RAW at the time of recording, and retry to read data at the time of reproduction, respectively. They are defined such that when the bit is "1", the flag "prevents" the write, read, write retry or read retry and when the bit is "0", the flag "allows" such operation.

The fifth, sixth and seventh bits are reserved areas.

The eighth bit is a flag to open and/or close the volume. While recording is being done to the magnetic tape, "1 (open)" is set at this bit. When the recording is complete, "0 (closed)" is set.

Next, the structure of the volume tag in the field FL3 in FIG. 8 will be described below with reference to FIG. 13. The size of each data (in bytes) is shown at the right.

The "volume tag" has at the top thereof a "volume information checksum" including a checksum of "volume information", in which basic management information for the entire tape cassette is stored.

Further to the "volume information", there is provided an "accumulative partition information checksum" including a checksum of "accumulative partition information", in which history of use of the tape cassette, having been accumulated starting at the manufacture of the tape cassette is stored.

Following the "accumulative partition", there are provided a "volume note checksum", "volume note" and a "cartridge serial number". There is stored in the "cartridge serial number" area a serial number being a 32-character information based on the ASCII code for example.

The "cartridge serial number" is followed by a "manufacturer ID" in which a code number for the tape cassette manufacturer is stored as a manufacturer identifier.

Further, the "manufacturer ID" is followed by a "secondary ID" for the type of the tape cassette, in which an tape attribute information is stored as a code value of one byte.

The "secondary ID" is followed by a "cartridge serial number part checksum" including a checksum of cartridge serial number, manufacturer ID and secondary ID.

The volume tag area (FL3) includes also "specific volume tags" 1 to 13 each of 36 bytes as a reserved area.

Next, the structure of the "volume information" in the field FL31 in FIG. 13 will further be described below with reference to FIGS. 14 to 17.

Figure 14:
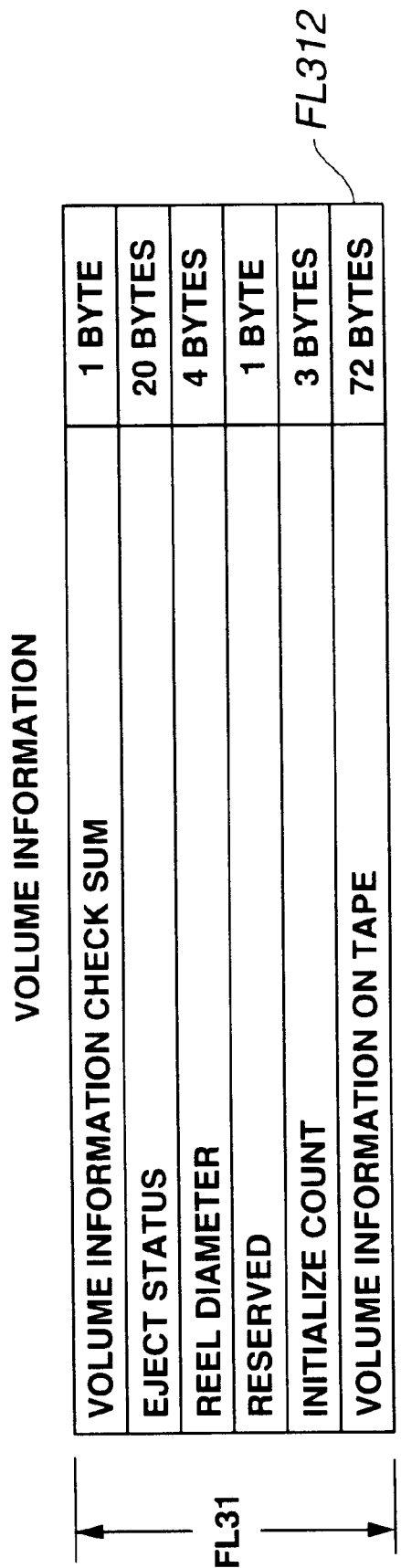
FIG. 14 shows the volume information in the MIC of the tape cassette.

As shown in FIG. 14, the volume information area stores, in the top area of one byte, a checksum of volume information.

The "volume information checksum" area is followed by an "eject status" of 20 bytes, "reel diameter" of 4 bytes, "initialize count" of 3 bytes, and a "volume information on tape" of 72 bytes in this order.

In the "eject status" area, there is stated information on the logical position of the magnetic tape 3 when the tape cassette is unloaded. In the "reel diameter" area, there are stated diameters of both the reel hubs 2A and 3B when the tape cassette is unloaded.

In the "initialize count" area, there is stored a number of initializations of the magnetic tape 3.

Figure 15:
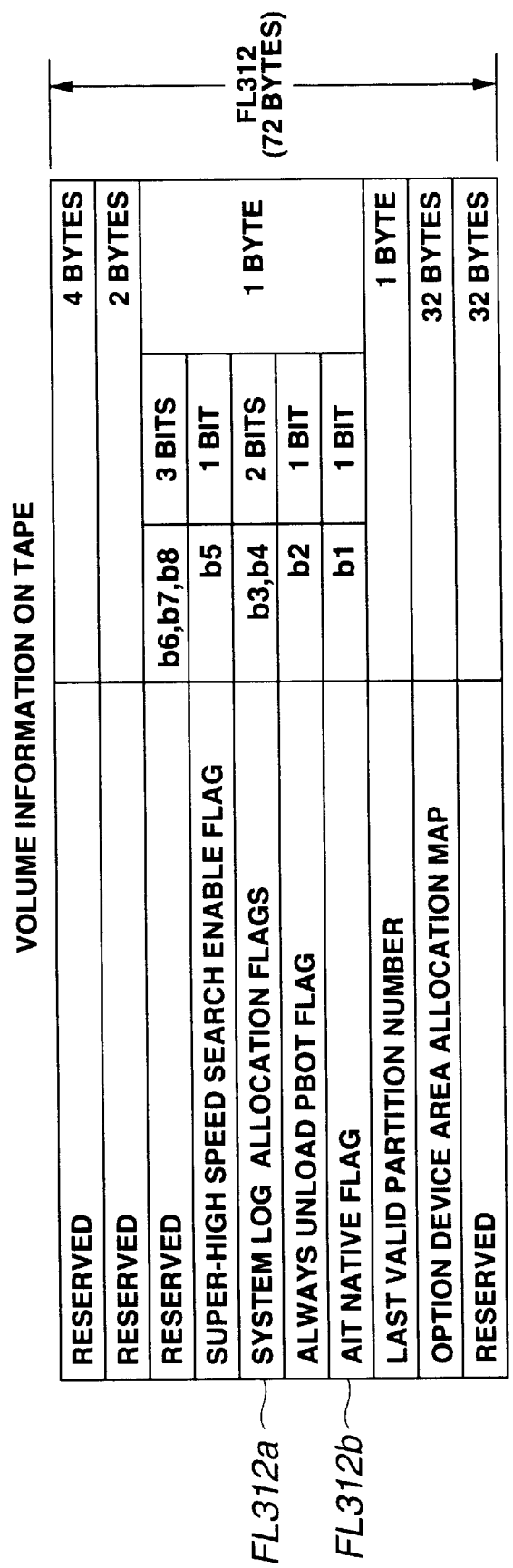
FIG. 15 shows the volume information on tape in the MIC of the tape cassette.

The volume information on tape indicated as the FL312 in FIG. 14 has a content as in shown in FIG. 15.

As shown in FIG. 15, the "volume information on tape" includes, in addition to reserved areas, a "super-high speed enable flag" of one bit, "system log allocation flags" of 2 bits, "always unload PBOT flag" of one bit, "AIT native flag" of one bit, "last valid partition number" of one byte, and "optional device area allocation map" of 32 bytes.

The "super-high speed search enable flag" indicates whether or not the tape position information stored as the absolute volume map of MIC 4 is to be utilized to validate a function to further increase the high-speed search.

The "system log allocation flags" indicates a location where there is stored a system log the tape streaming drive has to preferentially use for the system log of the tape cassette.

The definition of the "system log allocation flags" will further be described later.

The "always unload PBOT flag" indicates that the tape cassette is to be unloaded with the magnetic tape 3 at a device area at PBOT even if an optional device area exists in any of multiple partitions formed on the magnetic tape 3.

The "AIT native flag" indicates the mode of the tape cassette.

The "last valid partition number" indicates the number for the last partition formed on the magnetic tape.

The "optional device area map" area is of 256 bits each of which is for each of the partitions formed on the magnetic tape 3. When the bit value is "1", it indicates that an optional device area is formed in a partition corresponding to the bit.

The "system log allocation flags" indicated as a field FL321a in FIG. 15 will be described below.

As will be understood from the preceding and subsequent descriptions, there can be stored in MIC 4 predetermined management information (system log) including information indicating the history of use of the magnetic tape. As shown in FIGS. 6A, 6B and 6C and FIGS. 7A, 7B and 7C, the magnetic tape has formed thereon a system area in each partition, in which various kinds of management information can be stored. In this embodiment, the information stored in MIC 4 has the nearly same content as set for the system log in the system area on the magnetic tape.

As previously described with reference to FIGS. 7A, 7B and 7C, there are available two tape formats, mainly, the normal mode and multi-partition mode. The tape streaming drive 10 according to the present invention support both these modes.

For write or read of data to or from a tape cassette provided with MIC 4 for example, reference to or updating of the system log will not be done with respect to the system area but with respect to MIC 4 alone. That is, the system log stored in MIC 4 is preferentially used whether the tape cassette is formatted in the normal mode or multi-partition mode.

On the other hand, when writing or reading data to or from a tape cassette not provided with MIC 4 and which supports only the normal mode, data is written to or read from the system log area in the magnetic tape, to manage the data written or read to or from the magnetic tape.

That is, in this embodiment, the system log to preferentially be used exists in different locations from a tape cassette provided with MIC 4 to a one not provided with MIC 4.

The "system log allocation flags" is defined as identification information for indicating an above-mentioned location of the system log to preferentially be used by the tape streaming drive.

FIG. 16 shows the definition of the aforementioned "system log allocation flags" (field FL312a in FIG. 15).

As shown in FIG. 15 as well, the "system log allocation flags" information is represented by 2 bits (fourth and third bits) in a predetermined one-byte area.

As shown in FIG. 16, the fourth and third bits taking a value "0, 0" mean that the system log (management information) to preferentially be used exists in the magnetic tape alone. That is, the bits correspond to a tape cassette not provided with any MIC and which can support only the normal mode. In this case, the "system log allocation flags" information is recorded in a predetermined area of the system area on the magnetic tape.

The fourth and third bits taking a value "1, 1" mean that the system log to preferentially be used exists in MIC alone. These bits correspond to a tape cassette provided with MIC 4.

Note that in the tape cassette provided with MIC 4, when the magnetic tape is initialized for example, the value "1, 1" is set as the value of the fourth and third bits for the "system log allocation flags" in the system log in the MIC 4 and magnetic tape.

Also, the fourth and third bits taking a value "0, 1" mean that the system log to preferentially be used does not exist in both the magnetic tape and MIC. When they are "1, 0", the system log to preferentially used exists in both the magnetic tape and MIC.

Currently, however, when the fourth and third bits are "0, 1" or "1, 0", there exist no corresponding tape cassette and format and thus these values are not used in practice. That is to say, the fourth and third bits in the "system log allocation flags" for the tape cassette used in this embodiment take only the values "0, 0" and "1, 1" at present.

Next, the definition of the "AIT native flag" indicated as the field FL312b in FIG. 15 will further be described below with reference to FIG. 17.

As shown in FIG. 17, when the "AIT native flag" is "1", the tape cassette supports the AIT mode. When the flag is "0", the tape cassette supports a DDS emulation mode.

Normally, when the magnetic tape is a fresh one not yet formatted for example, the "AIT native flag" is defined as "0" which means that the tape cassette supports the DDS emulation mode.

The AIT mode ("1") and DDS emulation mode ("0") represented by the "AIT native flag" correspond to the tape formats shown in FIGS. 7A, 7B and 7C.

That is, the AIT mode ("1") indicates the multi-partition mode shown in FIG. 7C, while the DDS emulation mode ("0") indicates the normal mode in which the magnetic tape is formatted to have one partition as shown in FIG. 7A or two partitions as shown in FIG. 7B.

Namely, with the "AIT native flag", it is possible to identify in which of the multi-partition and normal modes the magnetic tape in the tape cassette is formatted.

Next, the cell stored in the field FL4 shown in FIG. 8 will further be described below.

As described in the above, the field FL4 includes the partition information cell areas, user partition note cell areas, etc.

The structures of these cells are as shown in FIGS. 18A and 18B.

One cell consists of 8 bytes of link information and n bytes of data (the number of bytes varies depending upon the type of cell) as shown in FIG. 18A.

The link information of 8 bytes is provided in each cell. Its structure is shown in FIG. 18B.

The link information contains a "cell checksum" of data in the cell.

The link information contains also a "cell size" indicating the size of the cell.

The link information further contains a "previous cell pointer" and "next cell pointer". These are actual linkage data (data building up a linkage structure). When a plurality of cells of the same type are linked to each other, previous and next cells are designated with these "previous cell pointer" and "next cell pointer", respectively.

The cells of such a structure include a partition information cell, absolute volume map information cell, user volume note cell and user partition note cell. The partition information cell has a fixed size, and each of other cells have a variable size.

The partition information cell having a fixed size will be described below with reference to FIGS. 19 and 20.

As shown in FIG. 19, the partition information cell consists of 8 bytes of link information, and 56 bytes of data as shown in FIG. 19. Eight of the 56 bytes of data are used as a partition memo while 48 bytes are used as partition information.

The partition information (system log) area has stored therein various kinds of information concerning the history of magnetic tape use in partitions to which the cells correspond. The tape streaming drive uses the information to manage the write checksum read operation thereof.

The data structure of partition information in a partition information cell corresponding to a cell is defined as shown in FIG. 20 for example.

The partition information cell includes a "previous groups written" area of 4 bytes, in which there is shown information on a number of groups having physically been written in the above partition in the magnetic tape, counted from the last updating of the partition information.

The partition information cell includes also a "total groups written" area of 4 bytes, in which there is indicated a number of groups having ever been written to the partition. The value will be cumulated until the service life of the tape cassette has come to end and the tape cassette cannot be used any more or is discarded.

When the tape streaming drive 10 is writing data to the magnetic tape 3, the values in these "previous groups written" and "total groups written" areas will be incremented by the system controller 15 of the tape streaming drive correspondingly to a number of groups newly recorded with the current recording operation.

The partition information cell includes also a "previous groups read" area of 3 bytes in which there is indicated information on a number of groups having physically been read, counted from the last updating of the partition information.

The partition information cell includes also a "total groups read" area of 4 bytes, in which there is indicated a number of groups having ever been read from the partition.

The partition information cell further includes a "total rewritten frames" area of 3 bytes in which there is indicated a cumulated number of frames to which it has been requested to rewrite data based on a command "read-after-write (will be referred to as "RAW" hereinafter).

In the tape streaming drive according to the present invention, the RAW operation will be such that data in a frame written to the magnetic tape 3 is read by the read head 13C for example just after the write. The data in the frame read with the RAW operation is subject to error detection by the system controller 15. When an error is detected in the data, the recording system is controlled to rewrite the data in the frame where the error has occurred. The cumulative number of frames to which data rewrite has ever been done in this way is the "total rewritten frames".

The partition information cell further includes a "total 3rd ECC count" area of 3 bytes, in which a cumulated number of groups in the partition, having been error-corrected using a C3 parity, is indicated.

In the tape streaming drive 10 according to the present invention, data read from the magnetic tape 3 is error-corrected using C1, C2 and C3 parities. The C3 parity is used when no data recovery can have been attained using only the C1 and C2 parities.

Also the partition information cell includes an "access count" area of 4 bytes, in which there is indicated a number of times the tape streaming drive has accessed the partition in the magnetic tape.

Further the partition information cell includes an "update replace count" area of 4 bytes, in which there is indicated a cumulated number of times by which data has been rewritten (written) to the partition in the magnetic tape by the updating. That is, the "update replace count" is a number of times the partition has been updated (data has been written to the partition).

Moreover the partition information cell includes a "previous written frames" area of 2 bytes, in which there is indicated a number of frames in a partition to which request for data rewrite has been made, counted the last updating of the partition information cell.

The partition information cell further includes a "previous 3rd ECC count" area of 2 bytes, in which there is indicated a number of groups having been error-corrected using the C3 parity, counted from the last updating of the partition information.

Also the partition information cell includes a "load count" area of 3 bytes, in which there is indicated a cumulated number of times the tape has been loaded.

Note that it is standardized that serial numbers starting with #1 for example should be assigned in an ascending order to the aforementioned frames. The serial number thus assigned are frame numbers.

The partition information cell further includes a "valid maximum absolute frame count" area of 3 bytes, in which there is indicated a count of frames down to the last valid frame in the partition, that is, a maximum one of the frame numbers counted in the valid areas in the partition.

The above information is consecutively rewritten as the data in the partition is rewritten and thus the end position of the data area is changed.

The partition information cell finally includes a "maximum absolute frame count" area of 3 bytes, in which a count of all frames in the partition is indicated. That is, there is indicated a last frame number (maximum) in the group of frames forming together the whole partition.

Once a partition is formed by pre-formatting for example, the above information will be a fixed value corresponding to a size (number of frames) of the partition and which will not be rewritten any longer.

Also, the partition information cell includes a "partition attribute flag" area of one byte, in which the flag at each bit has the following content:

That is, the flag at the first bit is a "previous write", the flag at the second bit is a "prevent read", the flag at the third bit is a "prevent write retry" and the flag at the fourth bit is a "prevent read retry". These flags are intended to allow/prevent writing to the partition, allow/prevent reading from the partition, allow/prevent data rewriting based on the RAW during recording, and allow/prevent data read retry during reproduction, respectively.

The fifth, sixth and seventh bits are reserved.

The flag at the eighth bit is a partition open/close flag. It is set during recording to the partition, and reset upon completion of recording.

Figure 21:
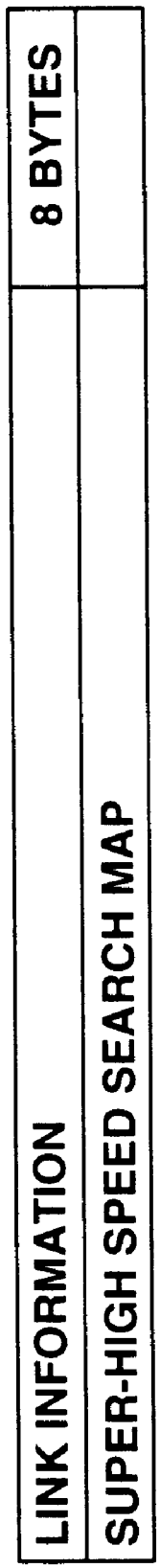
FIG. 21 shows the super-high speed search map cell in the tape cassette.

The "super-high speed search map cell" area formed at the end of the field FL4 has a cell structure with a link information as shown in FIG. 21. The information in this area is a data map necessary for implementing the high-speed search function which makes the most of the reel motor performance without real-time acquisition of ID information from the magnetic tape 3.

The high-speed search function using the super-high speed search map cell is as follows. For example, in the course of data writing to the magnetic tape 3, logical position information is written to the high-speed search supporting map at every tape run over 10 m. For searching a file position on the magnetic tape 3, first the map is checked and a position nearest (within 10 m) to and before the file position is selected which includes a sufficient margin. Since the magnetic tape thickness and reel diameters are known, the magnetic tape can be moved by counting reel FG pulses down to the indexed position, without reading ID on the magnetic tape. That is, the magnetic tape can be fed at such a high speed that no ID read from the magnetic tape is possible. When the indexed position is reached with the magnetic tape 3 made to run at such a high speed, the magnetic tape is slowed down to a speed at which the ID data can be read from the magnetic tape. Thus, a file position finally designed by the host computer is searched at an ordinary high speed.

The data structure in MIC 4 is as having been described with reference to FIGS. 8 thru 21. However it should be noted that the data structure in MIC 4 is just an example. The data allocation and area setting, data content, data size, etc. are not limited to those having been described in the foregoing.

5. Structure of tape cassette, which supports data format
5-1 Identification holes in tape cassette body As having previously been described, two data formats, AIT-1 and AIT-2, have ever been standardized for the embodiment of the present invention. Actually, there are formed in each of tape cassettes write protect holes corresponding to the AIT formats the tape cassette adopts, as will be described below. The tape cassette body has also formed therein an identification hole for discrimination between data storage and other application and a one for distinction from a cleaning tape cassette. Namely, the tape cassette has formed therein various identification holes corresponding to the type thereof.

These identification holes are detected by the hole detecting mechanism 26 shown in FIG. 1.

The tape cassettes usable with the tape streaming drive 10 according to the present invention include mainly a tape cassette supporting the AIT-1 format and a tape cassette supporting the AIT-2 format, standardized for the tape streaming drive. The tape cassettes also includes a cleaning tape cassette.

Figure 22A:
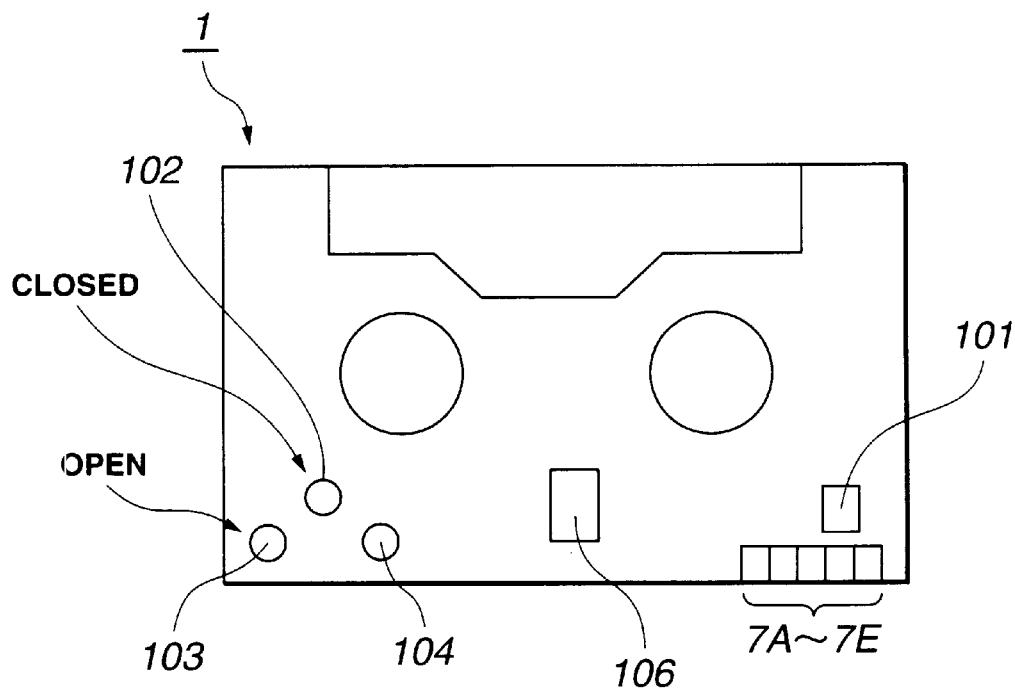
FIG. 22A is a plan view of an AIT-1 cassette.

FIG. 22A is a bottom view of the tape cassette supporting the AIT-1 mode (will be referred to as "AIT-1 tape cassette" hereinafter). Necessary identification holes are formed in the bottom of the tape cassette.

As shown in FIG. 22A, the AIT-1 tape cassette has a data storage identification hole 101 formed in the lower right portion (just above the terminal pins 7A to 7E) of the bottom thereof. The tape cassette according to the present invention has the same external shape as the so-called "8-mm video" tape cassette. The data storage identification hole 101, if formed open, indicates that the tape cassette is destined for the purpose of data storage. In other words, the data storage identification hole 101 is formed open only in a data storage tape cassette. Even if the "8-mm video" tape cassette has the same external shape as this tape cassette according to the present invention, the data storage identification hole 101 is not formed in the bottom of the "8-mm video" tape cassette.

In the lower left portion of the tape cassette body shown in FIG. 22A, there are formed a cleaning tape cassette identification hole 102, 8-mm video write protect hole 103 and an AIT-1 write protect hole 104.

The cleaning tape cassette identification hole 102 is destined for judging whether or not the tape cassette is a cleaning tape cassette. If the hole is formed open, the tape cassette is a cleaning tape cassette. If the hole is closed, the tape cassette is not any cleaning tape cassette. Therefore, when the tape cassette is the AIT-1 tape cassette, the cleaning tape cassette identification hole 102 is closed.

The 8-mm video write protect hole 103 is destined for judging whether or not writing protect function is set to prevent data write to an 8-mm video tape cassette. It is standardized for the AIT-1 tape cassette that the 8-mm video write protect hole 103 should be formed open.

The AIT-1 write protect hole 104 is intended to judge whether or not a write protect function is set to prevent data write to the AIT-1 tape cassette.

Figure 22B:
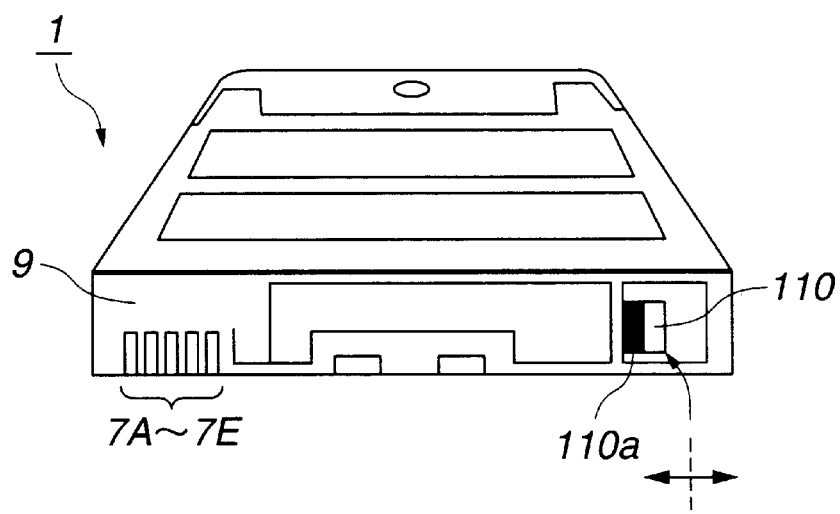
FIG. 22B is a perspective view of the AIT-1 cassette.

FIG. 22B is a perspective view of the AIT-1 tape cassette with a labeled side 9 thereof being at the front.

The AIT-1 write protect hole 104 in the AIT-1 tape cassette is closable or openable correspondingly to an operation of a write protect switch 110 shown in FIG. 22B. By sliding an operation tab 110a of the write protect switch 110 horizontally, the AIT-1 write protect hole 104 can be opened or closed.

When the AIT-1 write protect hole 104 is open, the tape streaming drive judges that the write protect function is set.

If it is closed, the drive judges that the write protect function is canceled (data write is possible).

The tape cassette has also formed therein a positioning hole 106. This hole is not any identification hole. When the tape cassette is loaded, a positioning pin will be inserted into the positioning hole 106 to secure the tape cassette to some extent.

Figure 23A:
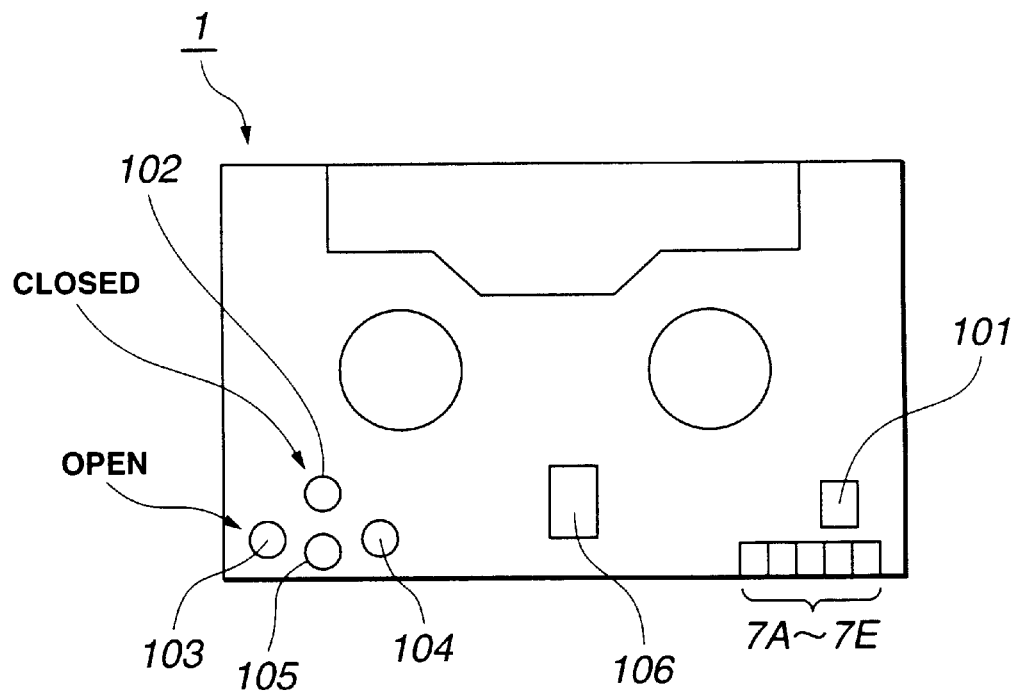
FIG. 23A is a plan view of an AIT-2 cassette.
Figure 23B:
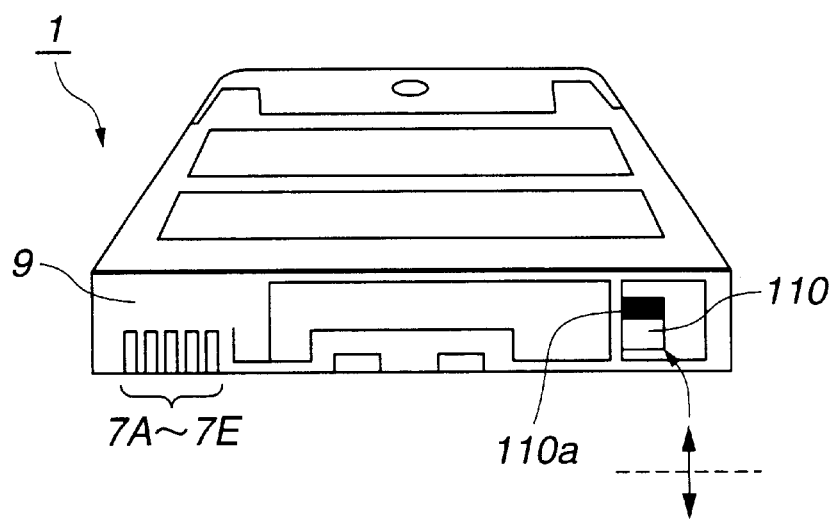
FIG. 23B is a perspective view of the AIT-2 cassette.

FIG. 23A is a bottom view of a tape cassette supporting the AIT-2 mode (will be referred to as "AIT-2 tape cassette" hereinafter). FIG. 23B is a perspective view of the AIT-2 tape cassette with the labeling side 9 thereof at the front. Note Note that in FIGS. 23A and 23B, the same or similar elements as or to those in FIGS. 22A and 22B are indicated with the same or similar references as or to those in FIGS. 22A ans 22B and will not further be described.

As shown in FIG. 23A, the AIT-2 tape cassette also has a data storage tape cassette identification hole 101 as in the AIT-1 tape cassette. With this identification hole 101, it can be judged that the tape cassette is a data storage tape cassette.

In the lower left portion of the tape cassette body, there is formed an AIT-2 write protect hole 105 in addition to the cleaning tape cassette identification hole 102, 8-mm video write protect hole 103 and an AIT-1 write protect hole 104.

In the AIT-2 tape cassette as well, the cleaning tape cassette identification hole 102 is closed and the 8-mm video write protect hole 103 is open. The AIT-1 write protect hole 104 is formed open.

The AIT-2 write protect hole 105 is intended to judge whether or not a write protect function is set to prevent data writing to the AIT-2 tape cassette. The AIT-2 write protect hole 105 is closed or opened correspondingly to an operation of the write protect switch 110 shown in FIG. 23B.

The operation tab 110a of the write protect switch 110 on the AIT-2 tape cassette is adapted to be slid vertically because of its geometrical relation with the AIT-2 write protect hole 105. By sliding the operation tab 101a, the AIT-2 write protect hole 105 can be opened or closed. When the AIT-2 write protect hole 105 is open, the tape streaming drive judges that the write protect function is set. If it is closed, the drive judges that the write protect function is canceled.

Figure 24A:
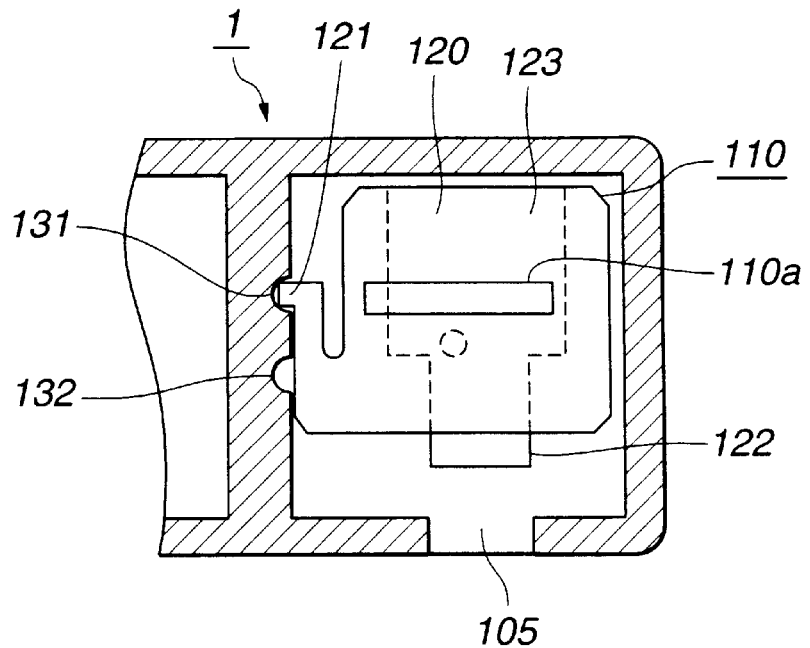
FIG. 24A is a sectional view showing the operations effected when the write protect hole in the AIT-2 cassette is opened.
Figure 24B:
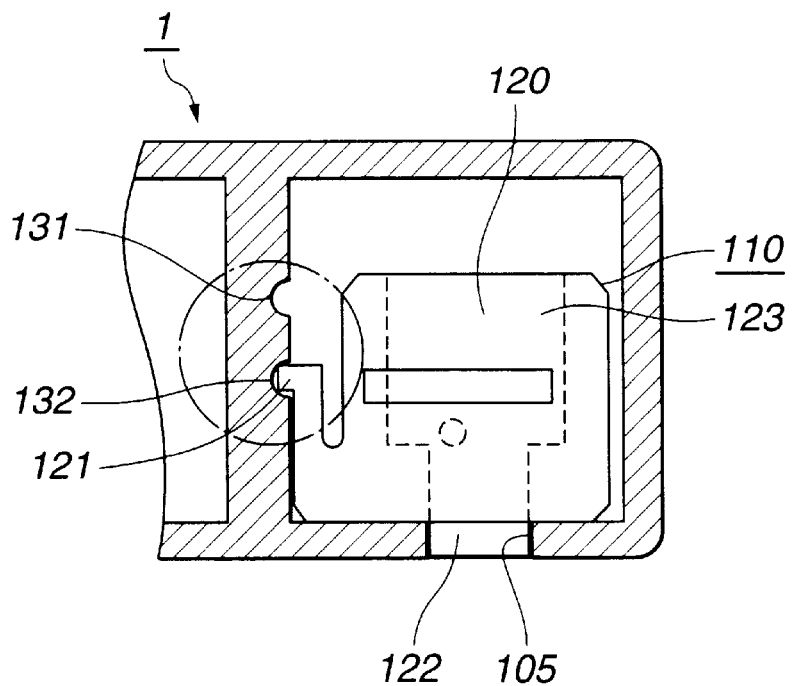
FIG. 24B is a sectional view showing the operations effected when the write protection hole in the AIT-2 cassette is closed.

FIGS. 24A and 24B schematically illustrate the write protect switch 110 on the AIT-2 tape cassette and an example of the interlocking mechanism to open and close the AIT-2 write protect hole 105. FIGS. 24A and 24B are sectional views of a portion of the tape cassette body where the write protect switch 110 is provided, when the switch 110 is in the position shown in FIG. 23B. The write protect switch 110 is formed from a synthetic resin for example.

As shown in FIG. 24A, the write protect switch 110 consists of a slider 120 which is slidable up and down as the operation tab 110a is moved, and a projection support 123 formed integrally with the slider 120. The slider 120 has a claw 121 which is somehow elastic. The projection support 123 has formed integrally at the bottom thereof a hole filling projection 122 shaped correspondingly to the AIT-2 write protect hole 105.

As shown in FIG. 24A, when the operation tab 110a is moved to the upper position, the claw 121 is engaged in a claw receiver 131. Thus the hole filling projection 122 is retained securely inside the tape cassette body and not inserted in the AIT-2 write protect hole 105. Namely, the AIT-2 write protect hole 105 is open.

When the operation tab 110a is moved to the lower position, the hole filling projection 122 is inserted into the AIT-2 write protect hole 105 as shown in FIG. 24B. The projection 122 fills the hole 105. Namely, the AIT-2 write protect hole 105 is closed. At this time, the claw 121 is engaged in a claw receiver 132, so that the AIT-2 write protect hole 105 is kept positively closed.

Thus, the AIT-2 write protect hole 105 is opened or closed depending upon whether the AIT-2 write protect switch 110 is set at the upper or lower position.

The above data storage tape cassette identification hole 101 is detected as will be described below with reference to FIGS. 25 and 26.

Figure 25:
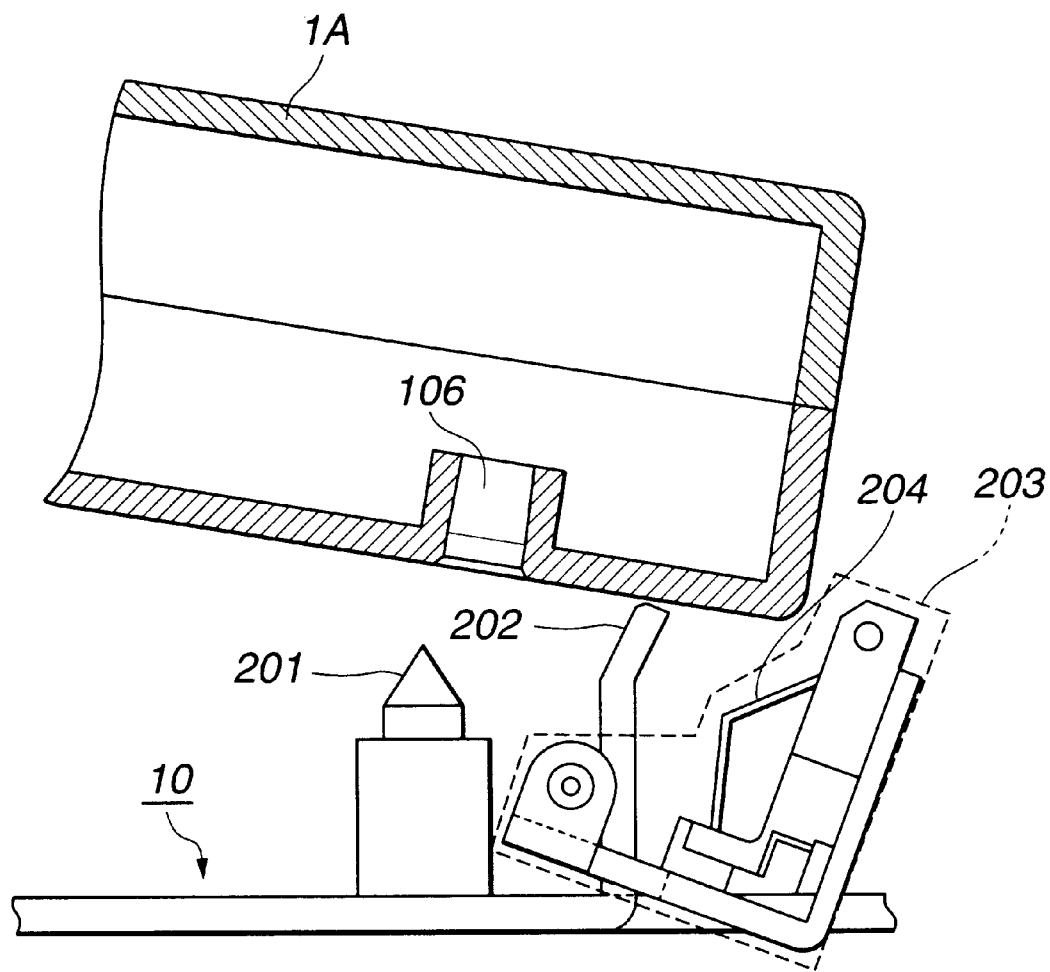
FIG. 25 is a side elevation of the internal mechanism of the tape streaming drive when a tape cassette not conforming to the specification of the tape streaming drive is loaded in the tape streaming drive.

FIG. 25 shows an 8-mm video tape cassette 1A inserted by mistake into the tape streaming drive 10 according to the present invention.

The tape streaming drive 10 is provided with a mechanism to act with the data storage tape cassette identification hole 101 formed in a tape cassette.

As shown, the mechanism includes a positioning pin 201, for example, provided to face a due position of the positioning hole 106 formed in a tape cassette and which is to be inserted into the positioning hole 106. Also, the mechanism includes an identification pin 202 shaped as shown in FIG. 25. The identification pin 202 is provided at a position opposite to the data storage tape cassette identification hole 101 in a tape cassette inserted into the tape streaming drive. Further the mechanism includes a movable connector block 203 as shown. The movable connector block 203 has connector pins 204. When a data storage tape cassette is inserted into the tape streaming drive, the connector pins 204 will be put into contact with the terminal pins 7A to 7E provided on the tape cassette.

The "8-mm video" tape cassette 1A has not formed therein the data storage tape cassette identification hole 101 already shown in FIG. 22A or 23B.

Therefore, when the "8-mm video" tape cassette 1A is inserted into the tape streaming drive 10 as shown in FIG. 25, the identification pin 202 abuts the bottom surface of the cassette body so that the "8-mm video" tape cassette 1A will not further be movable to the appropriate loading position. In this case, the tape streaming drive 10 will automatically eject the inserted "8-mm video" tape cassette 1A by a mechanical action.

As in the above, when there is inserted into the tape streaming drive 10 any tape cassette destined for other application than data storage (except for a cleaning tape cassette) such as the "8-mm video" tape cassette or a tape cassette intended for data storage but which is based on any other standard than that on which the tape streaming drive according to the present invention is based, it will first be ejected by the identification pin 202.

Figure 26:
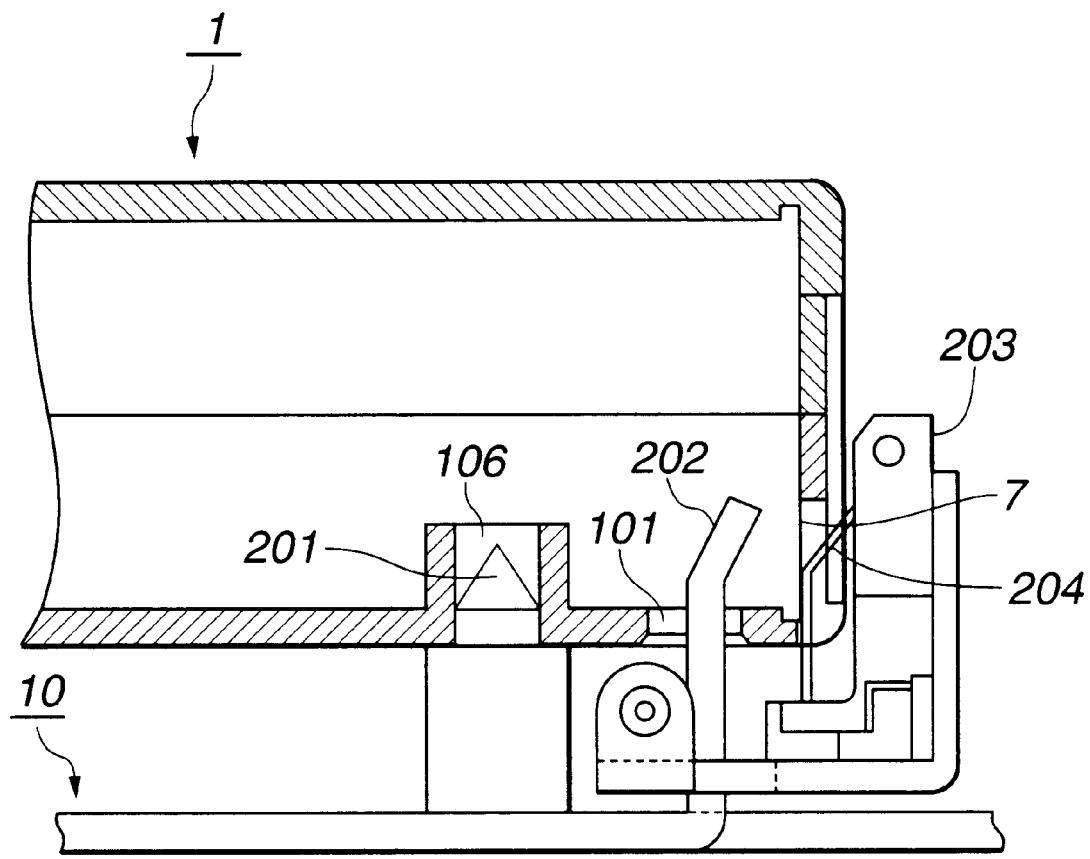
FIG. 26 is a side elevation of the mechanism of the tape streaming drive when a tape cassette conforming to the specification of the tape streaming drive is loaded in the tape streaming drive.

On the other hand, a data storage tape cassette (AIT-1 or AIT-2) can be loaded appropriately into the tape streaming drive as shown in FIG. 26.

Since the data storage tape cassette identification hole 101 is formed in a data storage tape cassette body, so when the data storage tape cassette is inserted into the tape streaming drive, the identification pin 202 included in the above mechanism can be penetrated through the data storage tape cassette identification hole 101, as shown in FIG. 26. As a result, the tape cassette can appropriately be loaded in the tape streaming drive.

When the tape cassette is appropriately loaded, the positioning pin 201 on the tape streaming drive 10 is penetrated through the positioning hole 106 in the tape cassette and thus positions the tape cassette correctly. Also the movable connector block 203 will be positioned as shown in FIG. 26 and put the connector pins 204 into contact with the terminals 7 on the tape cassette. In case the tape cassette is provided with the contact type MIC 4B, the tape streaming drive 10 is able to access the contact type MIC 4B.

Also a cleaning tape cassette can appropriately be loaded as shown in FIG. 26 since it is also provided with the data storage tape cassette identification hole 101, which is not shown. With the tape cassette set in such a status, the cleaning tape cassette identification hole 102, 8-mm video write protect hole 103, AIT-1 write protect hole 104 and AIT-2 write protect hole 105 shown in FIGS. 22A and 23A are detected by the hole detecting mechanism 26 (not shown in FIG. 26).

5-2 Magnetic tape identification stripe

According to the present invention, the magnetic tape used in the data storage tape cassette is adapted to identify the AIT format as will be described below with reference to FIG. 27A.

Figures 27A, 27B:
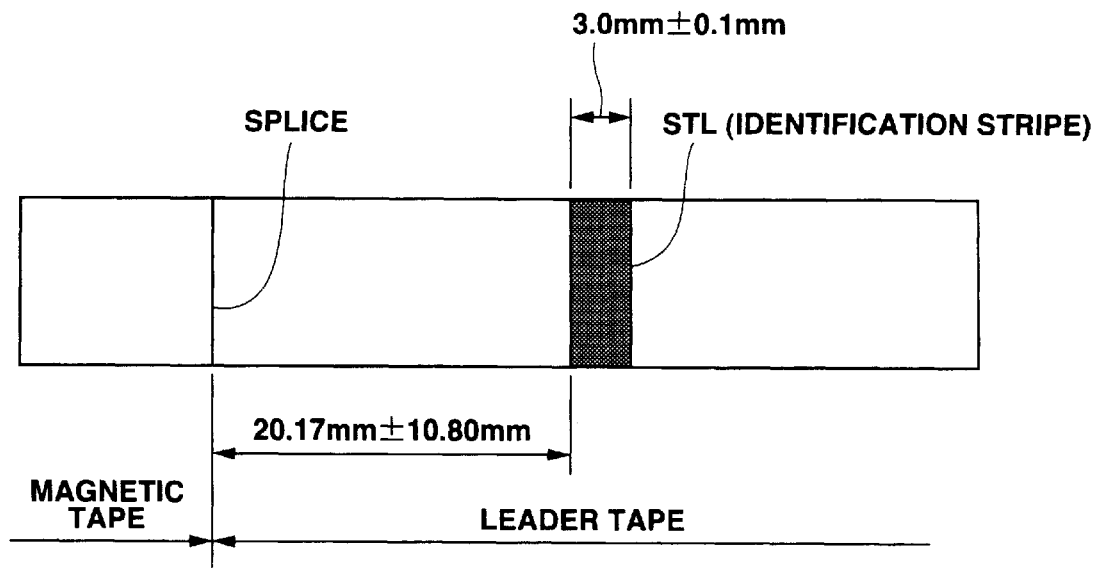
FIG. 27A shows the construction of an identification stripe formed on the leader tape in the tape cassette.
FIG. 27B shows the definition of the identification stripe formed on the leader tape in the tape cassette.

FIG. 27A shows the boundary between a leader tape and magnetic tape in the tape cassette according to the present invention. The leader tape leads the magnetic tape for winding on the reel hub. This is a non-magnetic portion where no data can be recorded. The leader tape is provided at either end of an entire magnetic tape. According to the present invention, the leader tape is so transparent as to transmit light through it.

As shown in FIG. 27A, an identification stripe STL is provided on the leader tape near PBOT. The identification stripe STL is formed by coloring a portion of the transparent leader tape in a predetermined color so that it will not pass light through it.

The standard on the identification stripe STL is such that the identification stripe STL should be 20.17±10.80 mm from a splice between the magnetic tape and leader tape, extend over the entire width of the magnetic tape and have a width of 3.0±0.1 mm in the tape running direction, as shown in FIG. 27A.

The identification stripe STL is detected by the stripe sensor 26a shown in FIG. 1. The stripe sensor 26a is formed from a photocoupler for example, and it detects whether or not the leader tape has the light-opaque portion according to the above-mentioned standard. The system controller 15 is adapted to detect, based on detection information from the stripe sensor 26a, whether the identification stripe STL exists or not in the leader tape.

According to a definition shown in FIG. 27B, when the identification stripe STL is not detected, the tape cassette is judged to support the AIT-1 mode (format). When the identification stripe STL is detected, the tape cassette is judged to support the AIT-2 or higher-order AIT mode (format).

6. Construction of tape streaming drive, which supports data format

As having been described in the foregoing, the tape streaming drive 10 according to the present invention is currently adapted to support the AIT-1 and AIT-2 formats.

One of the differences in signal characteristic between the AIT-1 and AIT-2 formats is a difference in encoding method. The AIT-1 format adopts PRML method, while the AIT-2 format adopts TCPR (Trellis partial response) method which is a combination of the PRML method and Trellis coding.

Figure 28:
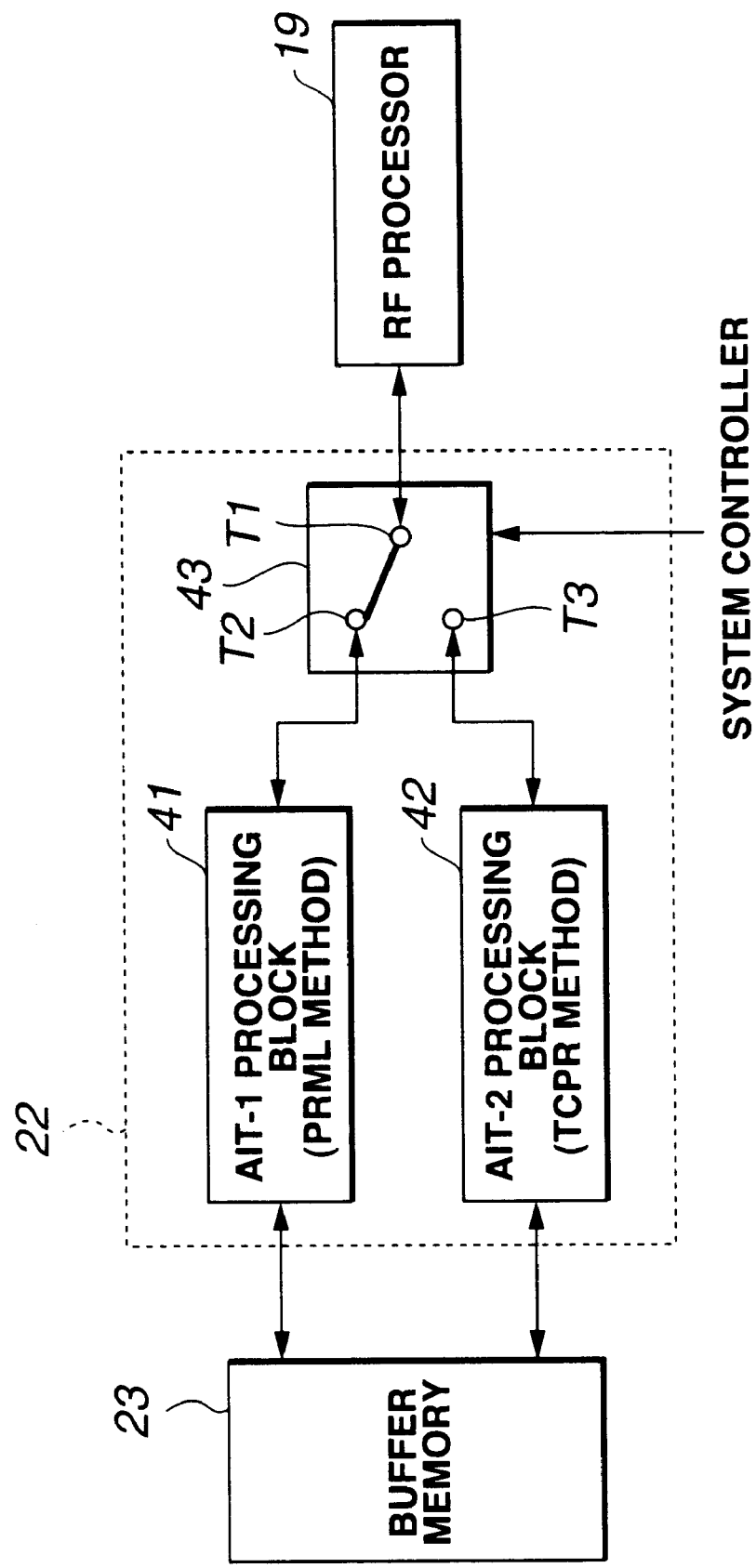
FIG. 28 is a block diagram of an IF/ECC controller supporting the data format.

Therefore, the IF/ECC controller 22 shown in FIG. 1 is actually constructed as shown in FIG. 28 for example.

As shown in FIG. 28, the IF/ECC controller 22 includes an AIT-1 processing block 41 and AIR-2 processing block 42.

The AIT-1 processing block 41 is provided for the AIT-1 format to encode and demodulate data according to the 'PRML method.

The AIT-2 processing block 42 is provided for the AIT-2 format to encode and demodulate data according to the TCPR method.

There is also provided the RF processor 19 shown also in FIG. 1, and a switch 43 is provided in the signal path between the AIT-1 and AIT-2 processing blocks 41 and 42 and the RF processor 19 as shown in FIG. 28.

The switch 43 has terminals T1, T2 and T3. Any of the terminals T2 and T3 is selectively connected to the terminal T1. In this embodiment, the terminal T2 is connected to the AIT-1 processing block 41 while the terminal T3 is connected to the AIT-2 processing block 42. The terminal T1 is connected to the RF processor 19.

In this embodiment, the AIT-1 and AIT-2 processing blocks 41 and 42 are connected at other inputs and outputs thereof to the buffer memory 23 shown also in FIG. 1.

When a tape cassette loaded in the tape streaming drive is judged to have the AIT-1 format (the operations for this judgment will further be described later), the system controller 15 allows the switch 43 to connect at the terminal T1 thereof to the terminal T2. Thus the AIT-1 processing block 41 will be connected to the RF processor 19. Namely, the IF/ECC controller 22 will operate in a mode supporting the AIT-1 format (namely, AIT-1 mode).

On the other hand, when the loaded tape cassette is judged to have the AIT-2 format, the system controller 15 allows the switch 43 to connect at the terminal T1 thereof to the terminal T3. In this case, the AIT-2 processing block 42 will be connected to the RF processor 19, and the IF/ECC controller 22 will operate in a mode supporting the AIT-2 format (namely, AIT-2 mode).

The AIT-1 and AIT-2 formats are different from each other in recording density with which data is written to the magnetic tape. It is standardized that the AIT-2 format being a higher-order format should be higher in recording density than the AIT-1 format.

Therefore, the AIT-1 mode-oriented signal processing operations effected in the IF/ECC controller 22 and clock frequencies used in the RF processor 19 and compander 21 are appropriately different from those for the AIT-2 mode.

7. Operations to identify data format

Next, on the basis of the description having been made in the foregoing, operations effected by the system controller 15 in the tape streaming drive 10 according to the present invention to judge the type (also data format) of a tape cassette used in the drive 10 will be described herebelow with reference to FIGS. 29 to 32.

Figure 29:
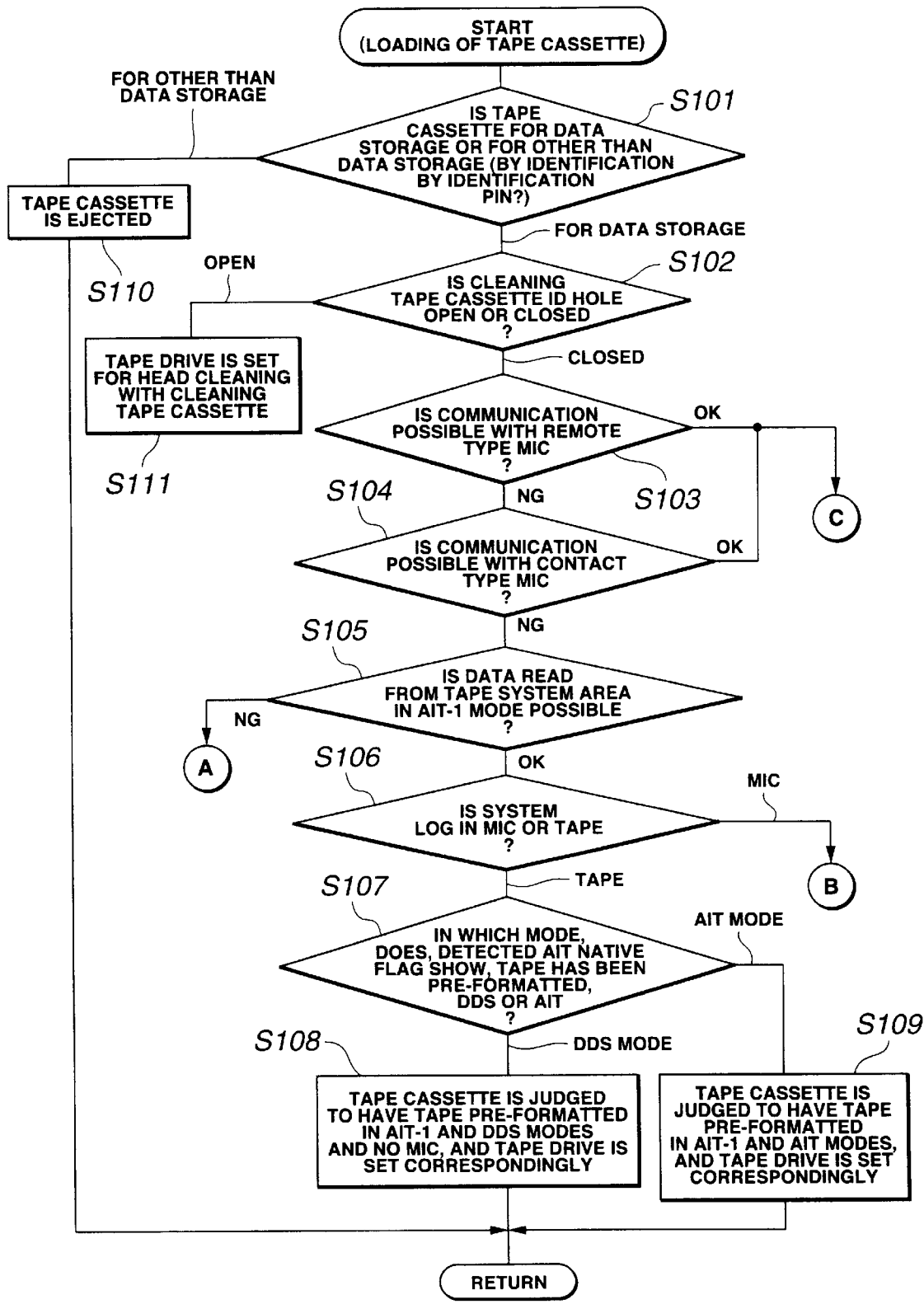
FIG. 29 is a flow chart (routine for checking the MIC and magnetic tape) of operations effected to identify the data format and tape format of a tape cassette loaded in the tape streaming drive.

As shown in FIG. 29, after a tape cassette is inserted into a tape cassette slot of the tape streaming drive 10, the identification pin 202 is used to judge the type of the tape cassette at step S101. That is, as described in the above with reference to FIGS. 25 and 26, it is judged which the tape cassette is, a data storage tape cassette (including a cleaning tape cassette supported by the tape streaming drive 10 according to the present invention) or a tape cassette for other application such as an "8-mm video" tape cassette or a data storage tape cassette made by other manufacturers employing other standards than the standard for the tape cassette according to the present invention.

If the tape cassette is judged to be for another application than the data storage, the system controller 15 ejects the tape cassette at step S110 and exits this routine by returning to the beginning of the procedure.

On the other hand, when the tape cassette is judged at step S101 to be a data storage tape cassette, the system controller 15 goes to step S102. When the system controller 15 goes from step S101 to S102, the tape cassette is appropriately loaded in position in the tape streaming drive 10 as previously described with reference to FIG. 26.

At step S102, it is judged, based on detection information supplied from the hole detecting mechanism 26 and corresponding to the cleaning cassette identification hole 102, in which state the cleaning tape cassette identification hole 102 is, open or closed.

When the cleaning tape cassette identification hole 102 is judged to be open, the tape cassette loaded in the tape streaming drive 10 is judged to be a cleaning tape cassette. In this case, the system controller 15 goes to step S111 and makes operations for cleaning the heads with the cleaning tape in the cassette. That is, the tape streaming drive 10 is internally set for predetermined operations for the head cleaning with the cleaning tape cassette.

On the other hand, when the cleaning tape cassette identification hole 102 is judged at step S102 to be closed, the tape cassette is judged to be a data storage tape cassette, and the system controller 15 goes to step S103.

At step S103, it is judged whether access to (communication with) the remote type MIC is possible or not. For this purpose, the system controller 15 uses the communication circuit of the remote memory I/F 30 shown in FIG. 1 to try to write to the remote type MIC.

Figure 32:
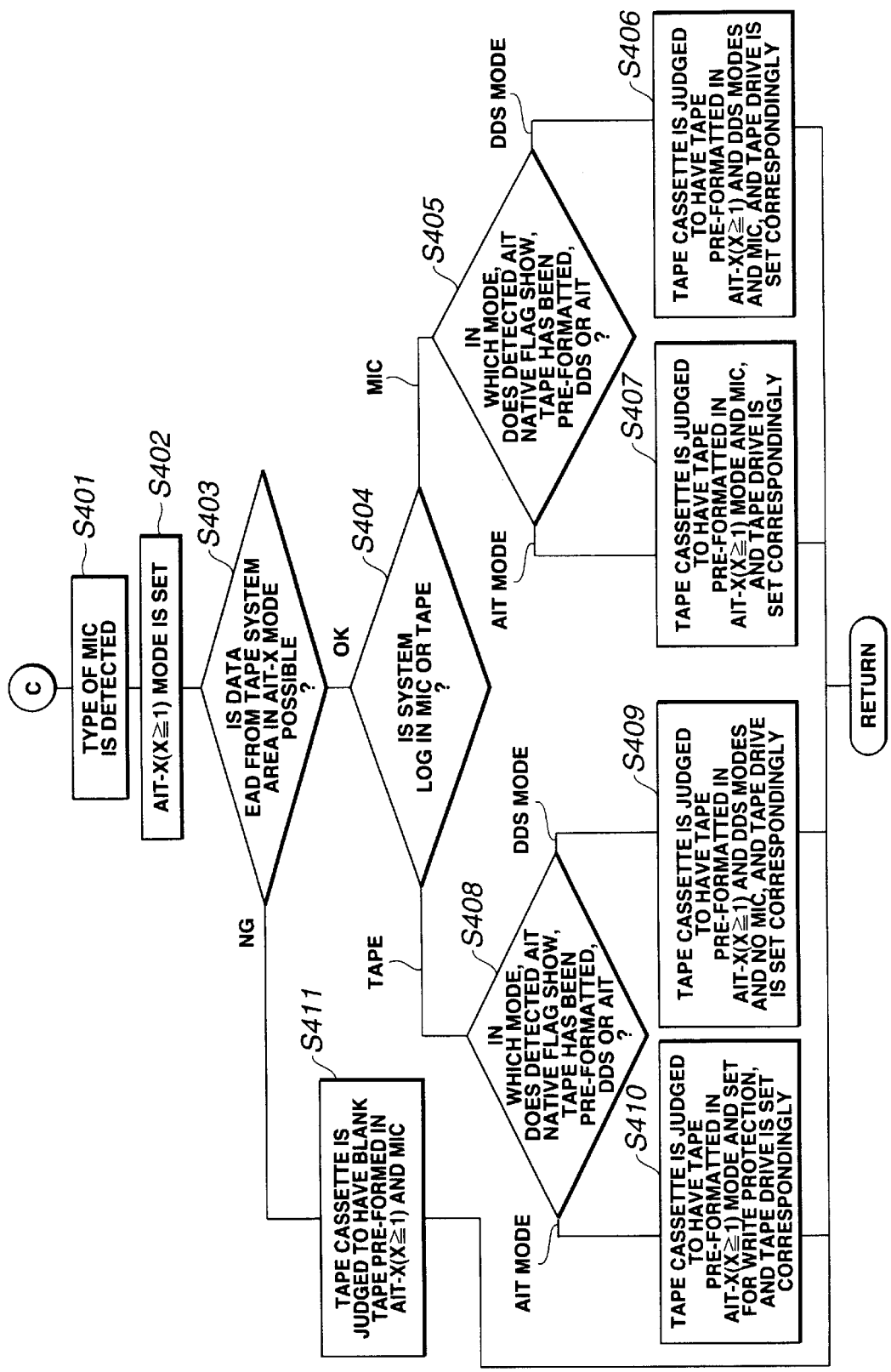
FIG. 32 is a flow chart (routine to be executed when the MIC is defective) of operations effected to identify the data format and tape format of a tape cassette loaded in the tape streaming drive.

If it is decided at step S103 that the access to (or communication with) to the remote type MIC is possible (OK), the system controller 15 will move to step S401 in FIG. 32. When the communication is judged to be impossible (NG), the system controller 15 will go to step S104.

When the communication with the remote type MIC is judged to be impossible (NG), it is possible that the tape cassette is of a type not provided with the remote type MIC 4A, it is of a type provided with the remote type MIC 4A which however is faulty or the communication circuit of the remote memory I/F 30 in the tape streaming drive 10 is faulty.

At step S104, it is checked whether or not the communication with the contact type MIC 4B is possible. That is, data read from the contact type MIC 4B is tried via the connector 27 shown in FIG. 1.

When the communication with the contact type MIC 4B is judged to be possible (OK), the system controller 15 goes to step S401 in FIG. 32. If the check result is NG, the system controller 15 goes to step S105.

If the communication with the contact type MIC 4B is judged to be impossible (NG), it is possible that the tape cassette is of a type not provided with the contact type MIC 4B, it is of a type provided with the contact type MIC 4B which however is faulty or the pin terminal of the contact type MIC 4B or connect 27 of the tape streaming drive 10 is in poor contact.

Therefore, when the system controller 15 goes to step S105, it is possible that a data storage tape cassette not provided with any MIC 4 is loaded or a tape cassette provided with MIC 4 is loaded but no communication can be done with MIC 4 for any reason.

At step S105, the tape streaming drive 10 is internally set in the AIT-1 mode corresponding to the AIT-1 format. The setting of the AIT-1 mode has already been described with reference to FIG. 28 and others for example. Also, data read from the system area of the magnetic tape is tried in the AIT-1 mode.

If the communication with MIC 4 is impossible (NG), it is possible that the magnetic tape is a blank tape where no data is recorded or it is a magnetic tape having been pre-formatted in any other format than AIT-1 and having data recorded therein. In this case, the system controller 15 will go to step S201 in FIG. 30.

On the other hand, if it has been checked at step S105 that the communication with MIC 4 is possible (OK), the system controller 15 will go to step S106.

When the system controller 15 has gone to step S106, information recorded in the system area of the magnetic tape has been acquired. For example, the information in the system area of the magnetic tape is held in the S-RAM 24. Therefore, the content of the system log in the system area is also held in the S-RAM 24.

At step S106, reference is made to the system log allocation flags (see FIGS. 15 and 16) to judge in which the system log to preferentially be used is, MIC 4 or magnetic tape (system area).

Figure 31:
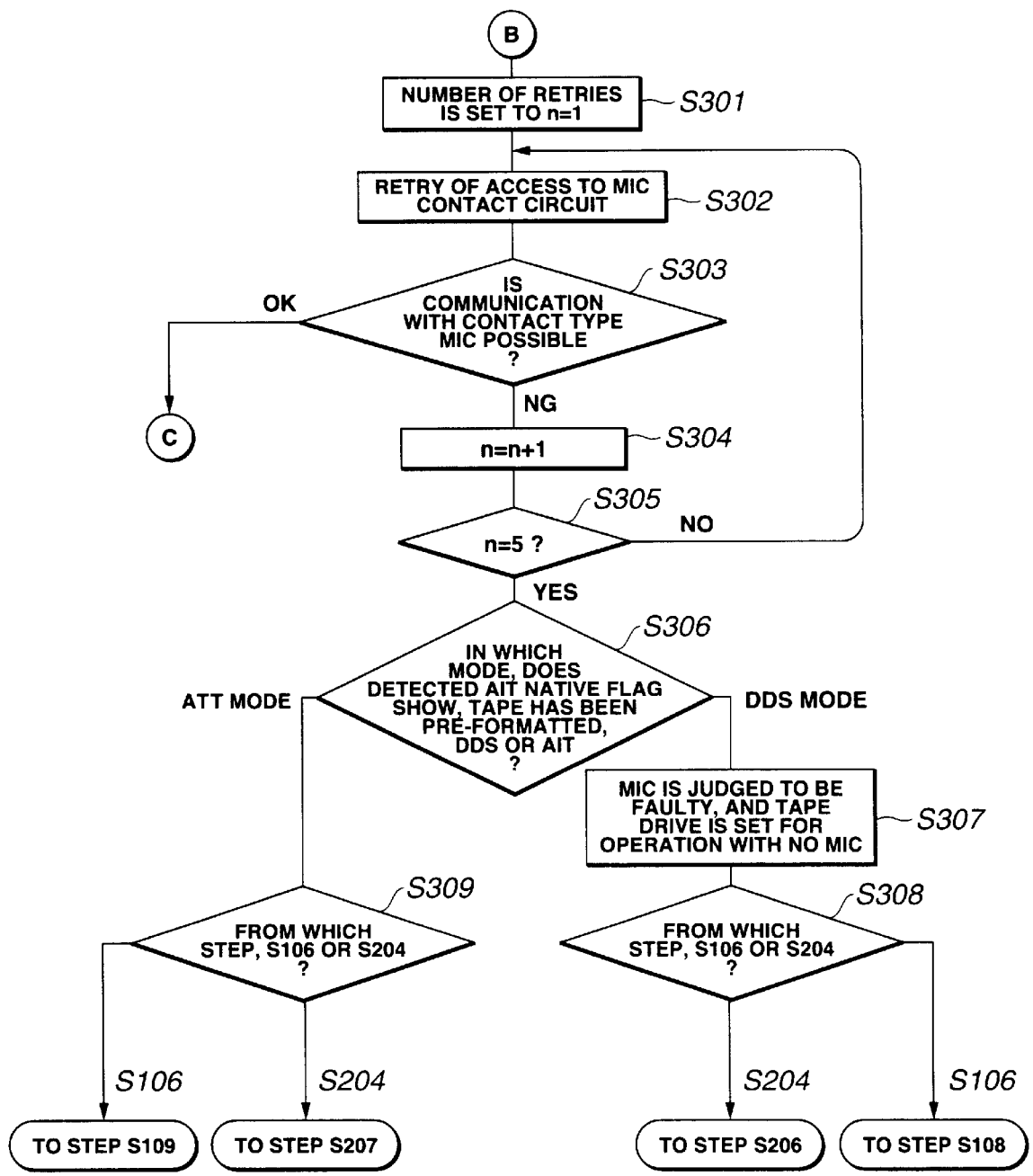
FIG. 31 is a flow chart (routine to be executed when the MIC is defective while the magnetic tape is defective) of operations effected to identify the data format and tape format of a tape cassette loaded in the tape streaming drive.

When the system log allocation flags indicate MIC 4 (namely, the fourth and third bits are "1, 1"), the system controller 15 goes to step S301 in FIG. 31.

At step S106, it is judged whether or not the system log allocation flags show that the system log in consideration is in MIC 4. Since it has been checked at previous steps S103 and S104 that the communication with MIC 4 is impossible (NG) although the system log allocation flags show that the system log in consideration is in MIC 4, it can be ascertained nearly positively that the tape cassette is provided with MIC 4 but the communication with MIC 4 is not possible for any reason.

On the other hand, if it is judged at step S106 that the system log allocation flags show that the system log to preferentially be used is in the magnetic tape (that is, the fourth and third bits are "0, 0", the system controller 15 will go to step S107.

It will be judged at step S106 that the system log allocation flags show that the system log in consideration is in the magnetic tape, when a tape cassette not provided with MIC 4 is loaded in the tape streaming drive. The tape cassette not provided with MIC 4, referred to herein, is a tape cassette which is not physically provided with MIC 4 or a one physically provided with MIC 4 but for which the system log allocation flags show that the tape cassette is not logically provided with MIC 4.

In the tape streaming drive 10 according to the present invention, if MIC 4 provided in the tape cassette is judged to be faulty (this judging operation will further be described later), the system log allocation flags are rewritten to show that the system log is in the magnetic tape (namely, the fourth and third bits are "0, 0"), to thereby assure at least subsequent appropriate operations for data reading. This tape cassette is a one which has been regarded as not logically having MIC 4 in the above.

Thus, a tape cassette provided with MIC 4 is handled as a one not provided with MIC in the system log in the magnetic tape, and thus handled as a tape cassette without MIC at the host computer for example.

At step S107, it is judged by detecting the AIT native flag, shown in FIGS. 15 and 17, in the system log acquired from the magnetic tape, in which the magnetic tape is pre-formatted, DDS emulation mode (normal mode) or AIT mode (multi-partition mode).

If it is judged at step S107 that the magnetic tape is pre-formatted in the DDS emulation mode (normal mode), the system controller 15 goes to step S108.

The system controller 15 will go to step S108 when the loaded tape cassette has data recorded therein in the AIT-1 format and the magnetic tape in the tape cassette has one or two partitions formed therein is the normal mode (DDS mode).

At step S108, the system controller 15 judges that the loaded tape cassette is not physically or logically provided with MIC and the magnetic tape is pre-formatted in the AIT-1 format and normal mode. Thus, the tape streaming drive is internally set correspondingly.

One of the drive settings is to set the internal function circuit in the AIT-1 mode as having previously been described with reference to FIG. 28. In this case, since the magnetic tape is pre-formatted in the normal mode (DDS mode), the DDS emulation mode is set.

When in the DDS emulation mode, the system controller 15 controls each functional circuit so that the tape streaming drive 10 makes writing and reading operations correspondingly to the normal mode (one-partition or multi-partition mode).

The operation in the DDS emulation mode is to access the partition for example.

Since the tape streaming drive 10 is initially designed to operate in the multi-partition mode, if a command of request for access to the partition #0 is transmitted from the host computer 40 for example, the tape streaming drive 10 will access the top partition in the magnetic tape. Similarly, if a command of request for access to the partition #1 is transmitted from the host computer 40, the tape streaming drive 10 will access the second top partition in the magnetic tape. With these operations, it is possible to appropriately access a magnetic tape with multiple partitions as shown in FIG. 7C.

When in the DDS emulation mode, if a command for access to the partition #0 is transmitted from the host computer 40 for example, the system controller 15 will make a replacement to handle the partition #0 not as the top partition but as the second top partition, and allow the tape streaming drive to access the magnetic tape after completion of this replacement. Similarly, when a command for access to the partition #1 is transmitted from the host computer, the system controller 15 will make a replacement to handle the partition #1 as the second top partition, and allow the tape streaming drive to access the magnetic tape after completion of the replacement. With the above replacement effected when in the DDS emulation mode, it is possible to appropriately access the magnetic tape correspondingly to the two-partition normal mode shown in FIG. 7B.

When in the one-partition normal mode shown in FIG. 7A, the above access to the partition is not required since only one partition is formed in the magnetic tape.

On the other hand, when it is judged at step S107 that the magnetic tape is reformatted in the AIT mode, the system controller 15 goes to step S109.

The system controller 15 will go to step S109 when the following tape cassette is loaded in the tape streaming drive.

As having previously been described, it is standardized that a tape cassette formatted in the AIT mode (multi-partition mode) is provided with MIC 4. However, when the system controller 15 goes to step S109, it has been judged at step S106 that the system log allocation flags show that the system log is in the magnetic tape.

That is, the system controller 15 will go to step S109 when MIC of a tape cassette loaded in the tape streaming drive 10 some time in future and in which the data format is the AIT-1 format and tape format is the AIT mode (multi-partition mode), is judged to be faulty, the system log allocation in the magnetic tape is updated so that the system log allocation flags show that the system log is in the magnetic tape and the tape cassette is loaded again.

At step S109, the tape cassette is judged not to logically have MIC 4, and then judged to be pre-formatted in the AIT-1 format and AIT mode (multi-partition mode). Further, the tape cassette is set as a write-protected one. Namely, the tape cassette is regarded as a read-only one.

Figure 12:
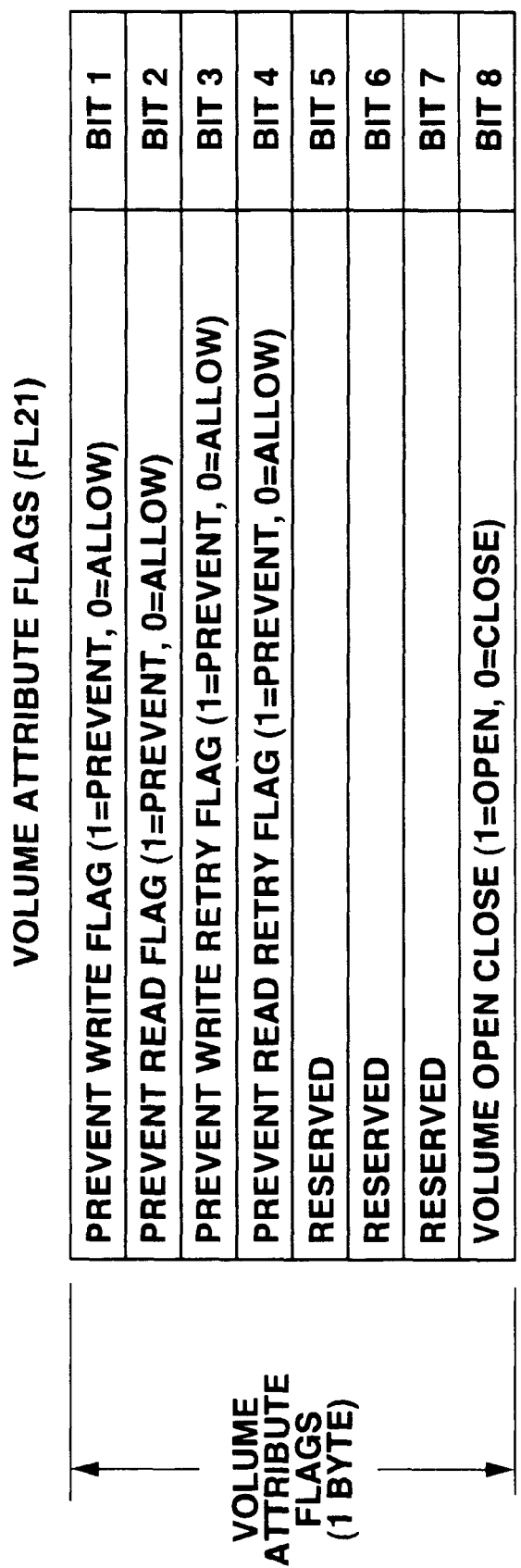
FIG. 12 shows the volume attribute flag in the MIC of the tape cassette.

For the write protection, the system controller 15 will effect the following operations on the assumption that of the system log in a tape cassette currently loaded in the tape streaming drive, the prevent write flag in the volume attribute flags shown in FIG. 12 for example is set to "1" (prevent). Thus, data writing to the magnetic tape will be prevented until the magnetic tape is unloaded.

For example, when a tape cassette whose MIC is faulty is handled as a one with no MIC as in the above, only the system log in the magnetic tape is updated, but not the system log in MIC, in the process of subsequent data writing to the magnetic tape. Therefore, there will take place a mismatching in content between the system log in the magnetic tape and that in the MIC. For use of the MIC recovered from the failure, it should preferably be avoided that there is such a mismatching in system log content between the magnetic tape and MIC. In case of a tape cassette pre-formatted in the multi-partition mode, access (read from or write to) MIC is required to write to or read from the magnetic tape. Especially during data recording, information is frequently rewritten depending upon the process of recording, and so dependence on the normal mode is higher than that on MIC.

By setting the write protect for a tape cassette regarded as having no MIC and pre-formatted in the AIT mode (multi-partition mode) so that only reading from the tape cassette will be done, the system log will not be done any longer due to recording and the discrepancy in system log content between the magnetic tape and MIC can be minimized.

At step S109, the tape streaming drive is also set to support the tape cassette judged as in the above. In this case, the tape cassette is handled as a read-only one to prevent data writing thereto and various functional circuits including the IF/ECC controller 22 are set to the AIT-1 mode.

At step S105 in FIG. 29, the communication with MIC 4 is judged to be impossible (NG), it can be estimated that the loaded tape cassette has a blank tape having no data recorded therein or a magnetic tape having data recorded in any other data format than the AIT-1 format. In this case, the system controller 15 goes to step S201 in FIG. 30.

Figure 30:
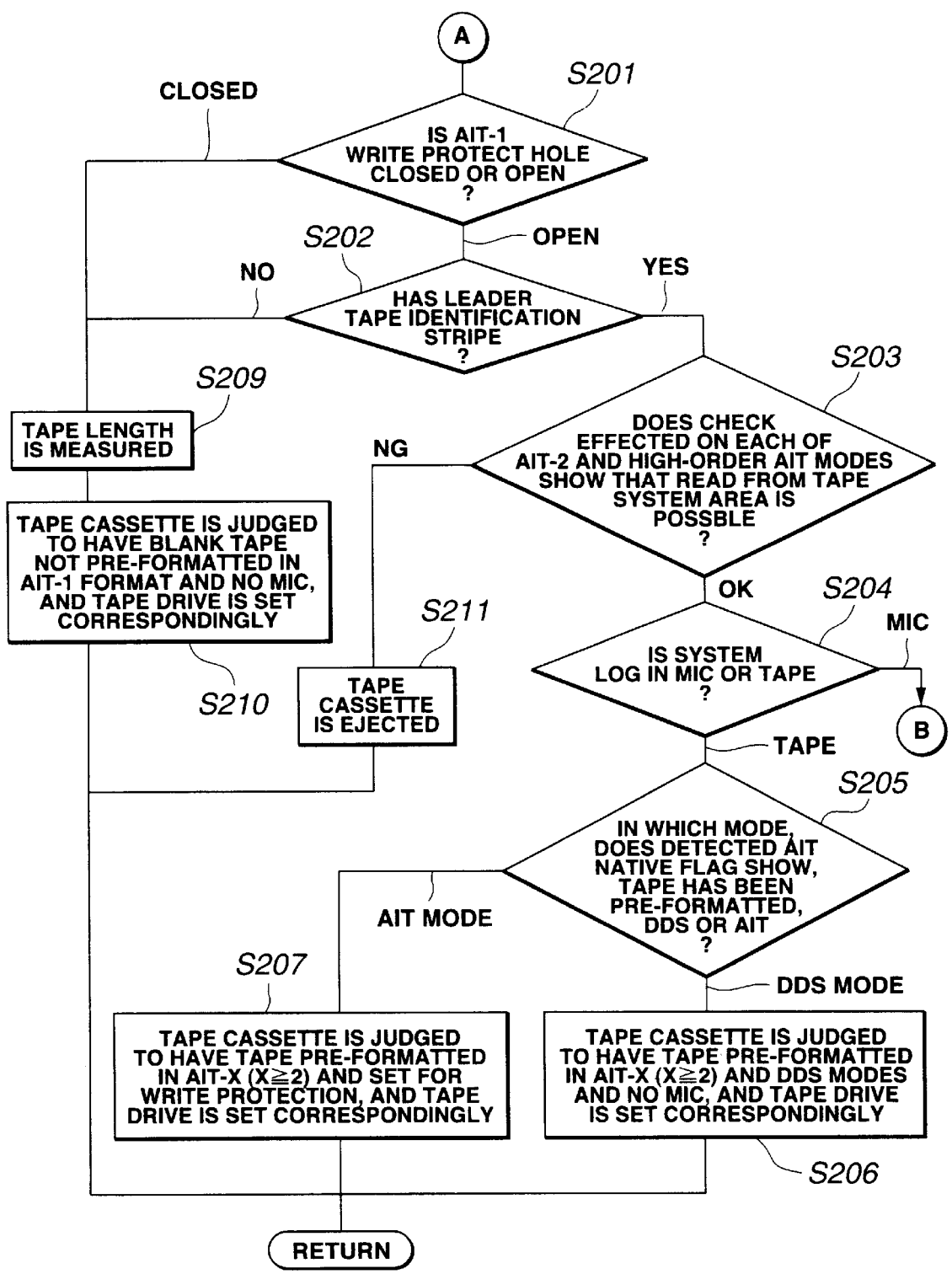
FIG. 30 is a flow chart (routine to be executed when the MIC and magnetic tape are defective) of operations effected to identify the data format and tape format of a tape cassette loaded in the tape streaming drive.

At step S201 in FIG. 30, the status, open or closed, of the AIT-1 write protect hole 104 in the loaded tape cassette is detected based on detection information from the hole detecting mechanism 26. When the AIT-1 write protect hole 104 is judged to be closed, the system controller 15 will go to step S209.

The system controller 15 will go to step S209 when the data read from the system area of the magnetic tape in the AIT-1 mode is judged at step S105 to be impossible (NG) and the AIT-1 write protect hole 104 is closed, namely, the write protect for the AIT-1 cassette is canceled. This will take place when the AIT-1 cassette has a blank tape.

At step S209, first the length of the tape in the tape cassette is measured. Actually, there is available a plurality of predetermined types of AIT-1 tape cassettes having magnetic tapes different in length, namely, recording capacity, from each other. For handling the currently loaded tape cassette as a blank tape cassette afterwards, for example, for appropriately initializing the tape cassette, the system controller 15 has to know the magnetic tape length. For this purpose, the tape length is measured as in the following at step S209.

In the tape streaming drive 10, the magnetic tape 3 is made to run at a predetermined ordinary speed for example, the diameter of the tape reel (referring herein to a diameter including the thickness of the tape wound on the reel hub) is measured, and a tape length is calculated based on the measured reel diameter. Conceptually, a lateral area of the magnetic tape 3 wound on the take-up reel is added to a lateral area of the magnetic tape wound on the supply reel to determine a sum of the lateral areas, an area of reel hub end face is subtracted from the sum, and the result is divided by a tape thickness. Thus a tape length is calculated.

The above concept of tape length measurement can be expressed by the following arithmetic expressions:

$$\begin{aligned}
\text{Tape\_length} &= \frac{\pi \times (T\_reel/2)^2 + \pi (S\_reel/2)^2 - 2\pi (Hub/2)^2}{t} \\
&= \frac{\pi}{4t}(T\_reel^2 + S\_reel^2) - \frac{\pi \times Hub^2}{2t} \\
&= \frac{\pi}{4t \times (0_x 10000)}\{(T - reel \times 0_x 100)^2 + (S - reel \times 0_x 100)^2\} - \\
&\quad \frac{\pi \times Hub^2}{2t} \\
&= \frac{\pi}{4t \times (0_x 10000)}\{M\_TR^2 + M\_SR^2\} - \frac{\pi \times Hub^2}{2t} \\
&= \{106 \times (M\_TR^2 / 0_x 1000)\}/0_x 1000 + \\
&\quad \{106 \times (M\_SR^2 / 0_x 100)\} - 54314
\end{aligned}$$

$\pi/4t = 106$ $\pi \times Hub^2/2t = 54314$ where T_reel is a diameter of take-up reel, S_reel is a diameter of supply reel, Hub is a diameter of reel hub, $t$ is a tape thickness (6.9 μm to 0.5 μm), M_TR is a take-up reel diameter supplied from the mechanical driver 17 (T_reel×$0_x$100), and M-SR is a supply reel diameter supplied from the mechanical driver 17 (S_reel×$0_x$100).

The above-mentioned tape thickness $t$ is preset for a tape length of 170 meters. According to the present invention, however, the tape thickness is not limited to 6.9 μm to 0.5 μm but it may be any other value. At step S209, the tape length is measured more than once, such as two times, and the two measured lengths are compared with a plurality of predetermined kinds of tape length. When the measured tape length is judged to be nearly coincident with any of the predetermined kinds of tape length, it is taken as the length of the tape in the tape cassette. The information of tape length thus determined is held in S-RAM 24 for example.

Next at step S210, the currently loaded tape cassette is detected as having no MIC and a blank tape whose data format is the AIT-1.

Also at step S210, the operations of the internal functional circuits of the tape streaming drive are controlled for the AIT-1 mode based on the result of tape cassette judgment, and the system controller 15 returns to exit this routine. The blank tape is initialized in the AIT-1 format (data format) if necessary afterwards.

On the other hand, if the AIT-1 write protect hole 104 is judged at step S201 to be open, the system controller 15 goes to step S202.

The system controller 15 will got to step S202 when the loaded tape cassette has not physically MIC 4, when the tape cassette has MIC 4 which however is faulty and with which no communication can thus be done (NG) and a AIT cassette blank tape (write-protected AIT-1 cassette as the case may be), or when the tape cassette is a one supporting the AIT-2 or higher-order format (including the AIT-2 tape cassette).

At step S202, the system controller 15 controls the tape streaming drive to detect the identification stripe STL on the leader tape having previously been described with reference to FIGS. 27A and 27B in order to judge which the tape cassette is, AIT-1 cassette or AIT-2 cassette (or an AIT cassette supporting the AIT-2 or higher-order format).

To this end, the system controller 15 has the magnetic tape run to the leader tape near PBOT until the leader tape with an identification stripe STL formed thereon goes out of the tape cassette to a position where the identification stripe STL can be detected by the stripe sensor 26a. Then the system controller 15 acquires detection information output from the stripe sensor 26a.

At step S202, when it is judged based on the detection information from the stripe sensor 26a that the leader tape has no identification stripe STL, the tape cassette will be judged to be a write-protected AIT-1 cassette containing a blank tape. Thus the system controller 15 will go to step S209 having already been described.

On the other hand, when it is judged at step S202 that the leader tape has the identification stripe STL, the tape cassette is estimated to be a tape cassette supporting the AIT-2 or higher data format.

In this case, the system controller 15 goes to step S203 where it will set the AIT-2 mode or a higher-order mode such as AIT-3, AIT-4, . . . or the like for the internal functional circuits and check the system area of the magnetic tape when in each of the modes. Currently, the tape streaming drive 10 according to the present invention is designed to support the AIT-1 and AIT-2 modes. However, the tape streaming drive 10 can be designed to support any higher data format than the AIT-2 data format.

If the magnetic tape has data recorded therein in a higher data format than the AIT-2, the system area can be read when the tape cassette has been checked with a data format AIT-X (X≧2) set. It is judged that data read from the system area is possible (OK), and the system controller 15 will go to step S204.

On the other hand, if it is judged at step S203 that data read from the system area is not possible (NG), namely, that data read has not been made from the magnetic tape in any AIT mode the tape streaming drive 10 can support, the system controller 15 will got to step S211.

When it is judged at step S203 that data read from the tape cassette is not possible (NG), it is considered that the tape cassette is an AIT-2 or higher-order tape cassette containing a blank tape or a tape cassette containing a magnetic tape in which data is recorded in a data format the tape streaming drive 10 according to the present invention cannot support. In this case, the system controller 15 goes to step S211 where it will control to eject the currently loaded tape cassette and return to exit this routine.

If the system controller 15 has gone to step S204 via step S203 having been described in the above, it will be judged at step S204 by referencing to the system log area in the tape system log information acquired at step S203 in which the system log to preferentially be used is, the magnetic tape or MIC 4.

When it is judged that the system log to preferentially be used exists in MIC 4, the system controller 15 goes to step S301 in FIG. 31. If it is judged that the system log is in the magnetic tape, the system controller 15 goes to step S205.

At step S205, an AIT native flag is detected in the system log acquired from the magnetic tape to judge in which the magnetic tape has been pre-formatted, DDS emulation mode (normal mode) or AIT mode (multi-partition mode).

When it is judged that the magnetic tape has been pre-formatted in the DDS emulation mode (normal mode), the system controller 15 goes to step S206 at which it will be judged that data has been written in the magnetic tape in the AIT-X (X≧2) in which, it has been detected at step S203, the system area can be read (OK) and the tape cassette has the tape initially formatted in the one- or two-partition normal mode (DDS mode) and no MIC 4.

Correspondingly, the AIT-X mode and also DDS emulation mode are set for the predetermined functional circuits in the tape streaming drive.

If it is judged at step S205 that the magnetic tape has been pre-formatted in the AIT mode, the system controller 15 goes to step S207.

At step S207, it will be judged whether data has been recorded in the tape cassette in a predetermined higher-order format than AIT-2 and has multiple partitions.

As having previously been described, however, the AIT mode (multi-partition mode) can only be supported by a tape cassette provided with MIC 4. Therefore, the tape cassette judged to meet the base of judgment at step S207 is a one capable of supporting the AIT-2 or higher-order data format, whose MIC has been judged to be faulty when the tape cassette is loaded some time in the future, and system log allocation flags have been rewritten to show the corresponding content of the magnetic tape.

Thus at step S207, the data format of the tape cassette is judged at step S203 to be a predetermined data format AIT-X higher than the AIT-2 and have a magnetic tape having been formatted in the multi-partition mode. Also in this case, the magnetic tape will be handled as a logically write-protected one on the basis having been described concerning step S109 in the foregoing.

The functional circuits in the tape streaming drive will be set in a predetermined AIT-X mode corresponding to the result of checking at step S203, and the tape streaming drive be internally set to prevent writing to the magnetic tape.

At step S106 in FIG. 29 and step S204 in FIG. 30, if it is judged that the system log allocation flags show that the system log exists in MIC 4, it will be estimated that the tape cassette is an AIT one provided with MIC 4 with which however no communication can be done for any reason.

If the MIC provided in the tape cassette is a remote type one, access to MIC cannot be recovered. However, when the MIC is a contact type, it is possible to recover the access to MIC by retrying access to the MIC if a poor contact of the MIC contact has caused the communication to be impossible.

If it is judged at step S106 or step S204 that the system log allocation flags show that the system log is in MIC 4, the system controller 15 goes to step S301 in FIG. 31 where the access to the contact type MIC 4B is retried as will further be described below.

At step S301, a variable n indicative of a number of retries is set n=1 and next at step S302, a control is made for the access-retrying operation. For example, the tape cassette supporting mechanism is slightly moved to recover a contact connection between the MIC 4B and tape streaming drive 10.

Next at step S303, write to the contact type MIC 4B is checked. When the communication is possible (OK), the system controller 15 goes to step S401 in FIG. 32. On the other hand, if the communication is not possible (NG), the system controller 15 will go to step S304 at which the variable n is incremented to n=n+1. Next, if it is judged at step S305 that the variable n has not yet reached n=5, the system controller 15 goes back to step S302 where the access to the contact type MIC 4B is retried. That is, the access is retried a maximum of 5 times. Note that this number of retries is just an example and it may freely be set.

If write to the contact type MIC 4B is impossible (NG) even with the five retries, the system controller 15 will go to step S306.

At step S306, it is judged in which mode the magnetic tape has been pre-formatted, DDS emulation mode (normal mode) or AIT mode (multi-partition mode), by effecting the operation at step S105 or S203 to detect an AIT native flag in the system log acquired from the magnetic tape.

If it is judged that the magnetic tape has been pre-formatted in the DDS emulation mode (normal mode), the system controller 15 goes to step S307.

At step S307, the MIC is judged to be faulty and internal functional circuits in the tape streaming drive are set on the assumption that no MIC logically exists. That is, as having previously been described, the system log allocation flags in the system log in the magnetic tape are rewritten to show that the system log to preferentially be used exists in the magnetic tape (fourth and third bits are "0, 0").

Next at step S308, for judgement of the tape cassette type (data format) and tape format, it is first judged via which step S308 has been reached, step S106 or S204.

If step S308 has been reached via step S106, the tape cassette in consideration is an AIT-1 tape cassette. Therefore, the system controller 15 will proceed to step S108 at which data and tape formats of the tape cassette are judged and tape streaming drive is internally set accordingly.

On the other hand, if the system controller 15 has reached step S308 via step S204, the tape cassette in consideration is an AIT tape cassette supporting a AIT-2 or higher-order data format. In this case, the system controller 15 will proceed to step S206 at which the data and tape formats of the tape cassette are judged and tape streaming drive is internally set accordingly.

In this case, at step S108 and S206, the tape cassette will be handled as not logically having MIC, based on the system log allocation flags set at step S307.

On the other hand, if it is judged that the tape cassette has a magnetic tape having been pre-formatted in the AIT mode, the system controller 15 will go to step S309.

At step S309, it is judged as at step S308 via which step S309 has been reached, step S106 or S204.

When it is judged that step S309 has been reached via step S106, the system controller 15 will got to step S109. On the other hand, if it is judged that step S309 has been reached via step S204, the system controller 15 will got to step S207 at which as having previously been mentioned, the tape cassette is judged concerning its data and tape formats and the tape streaming drive is internally set according to the result of judgment.

If it has been judged at step S103 or S104 in FIG. 29 that the communication with MIC 4 is possible (OK), or when it has been judged at step S303 in FIG. 31 that the communication with the contact type MIC 4B is possible (OK), the system controller 15 goes to step S401 in FIG. 32.

At step S401, the MIC type shown in FIGS. 9 and 10 is detected in the system log stored in MIC 4.

Actually, S-RAM 24 holds the information (system log) in MIC 4 since the write to MIC 4 is judged possible (OK) at step S103, S104 or S303. Subsequently, access is possible to the MIC system log stored in S-RAM 24. For example, when data is written to or read from the tape cassette loaded in the tape streaming drive, the system log stored in S-RAM 24 is first updated correspondingly to the result of the data write or read. The system log is updated to latest information by storing the content of system log into MIC in the tape cassette at a predetermined subsequent time.

Thus, for detecting the MIC type at step S401, the MIC type may be read directly from MIC 4. Actually, however, it suffices to read it by access to the MIC type area in the system log held in S-RAM 24.

By detecting the MIC type as shown in FIG. 10, an AIT-X ($X \geq 1$) format the tape cassette has to support is identified based on the seventh to fourth bits of the detected MIC type.

At next step S402, the mode of operation of the tape streaming drive 10 is set to AIT-X mode according to the MIC type detected at step S401, namely, the AIT-X ($X \geq 1$) format.

Next at step S403, the system area of the magnetic tape is checked in an AIT-X mode set at step S402. If it is judged that data write is impossible (NG), the system controller 15 will got to step S411.

At step S411, it is judged that the loaded cassette is provided with MIC and has a magnetic tape having been formatted in the AIT-X format and which is a blank one, and the system controller 15 will return.

If the result of check at step S403 is that the data write is possible (OK), the system controller 15 goes to step S404 at which the system log allocation flags in the system log acquired from the magnetic tape are detected. If the system log to preferentially be used is judged to be in MIC, the system controller 15 goes to step S405. On the other hand, if it is judged the system log to preferentially be used is in the magnetic tape, the system controller 15 will go to step S408.

At step S405, the AIT native flag is detected in the system log acquired from the magnetic tape. When the result of checking shows that the magnetic tape has been formatted in the DDS mode (normal mode), the system controller 15 goes to step S406. If the result of checking is that the tape format is the AIT mode (multi-partition mode), the system controller 15 will go to step S407.

At step S406, it is judged that the tape cassette is provided with MIC and having a magnetic tape having data recorded therein in the AIT-X format and having been formatted in the DDS mode (normal mode), and the system controller 15 returns. In this case, the tape streaming drive is set to the DDS emulation mode.

If the result of detection at step S405 is that the tape format is an AIT mode (multi-partition mode), the system controller 15 goes to step S407 at which it will judge that the tape cassette is a one provided with MIC and contains a magnetic tape having data recorded therein in the AIT-X format and having been formatted in then AIT mode (multi-partition mode), and the returns. At this time, the tape streaming drive is internally set to a mode of operation for the multi-partition mode.

If the system controller 15 judges based on the system log allocation flags that the system log to preferentially be used exists in the magnetic tape, which is the result of checking at step S404, it will go to step S408. The system controller 15 will go from step S404 to S408 when the tape cassette is loaded some time in the future, the MIC in the tape cassette will be judged to be faulty and the system log allocation flags of the magnetic tape are rewritten to show that the system log to preferentially be used exists in the magnetic tape.

At step S408, the system controller 15 will detect as at step S405 the AIT native flag in the system log acquired from the magnetic tape. If the result of detection shows that the tape cassette contains a magnetic tape having been formatted in the DDS mode (normal mode), the system controller 15 goes to step S409. When the result of detection is that the tape has been formatted in the AIT mode (multi-partition mode), the system controller 15 goes to step S410.

At step S409, the system controller 15 judges that the tape cassette is provided with MIC and contains a magnetic tape having data recorded therein in the AIT-X format and having been formatted in the DDS mode (normal mode).

The tape cassette is judged to have no MIC although the communication with MIC has been judged to be possible (OK), for the tape cassette has been judged at the time of loading to have MIC 4 which however is faulty. For example, with a tape cassette provided with MIC which has been judged even once to be faulty, poor contact or the like will recur in the course of an access to MIC for example so that the communication with MIC 4 will be disabled. Also, when MIC has ever been judged to be faulty and access to MIC 4 has be prevented, it is highly possible that the system log in MIC 4 is incorrect since the system log has been rewritten only in the magnetic tape in the course of a data write or read. Taking this in consideration, the tape cassette is not handled as a one with MIC from the beginning but it is handled as a one with no MIC, so that subsequent data written and read and data management can be done appropriately.

Note that the tape streaming drive will be set at step S409 to the DDS emulation mode.

At step S410, the system controller 15 will set the AIT-X format as data format, and AIT mode (multi-partition mode) as tape format. Also at this time, it is assumed in the system controller 15 that the prevent write flag of the volume attributes flag shown in FIG. 12 is set to "1" (prevent) so that the tape cassette will be treated as a write-protected one.

Also when the system controller 15 has reached this step S410 via step S404, the tape cassette has been judged at the time of loading to be a one with MIC 4 which however is faulty. Therefore, it is highly probable that MIC will be faulty during a subsequent data write. To avoid this, the data write to the magnetic tape is disabled also at step S410 while data read is enabled, thereby assuring appropriate operations for the data read which is low in dependence upon MIC.

In the foregoing, the operations for judgement of the data format and tape format of a loaded tape cassette have been described with reference to FIGS. 29 to 32. Normally, however, so long as communication with MIC 4 can be done normally, the tape cassette type can be judged with the operations at steps S101 to S104 in FIG. 29 and operations shown in FIG. 32. That is to say, if only an information write to MIC 4 is possible, at least the data format of the tape on cassette can be judged by identifying the MIC type in MIC 4.

Also, the embodiment of the present invention has been described in the foregoing concerning a tape streaming drive using as a recording medium the "8-mm video" tape cassette. However, it should be noted that the present invention is applicable to a system including a tape cassette and tape streaming drive conforming to any other standard so far as the cassette encasing a tape-shaped recording medium is provided with a memory element capable of storing defined management information.

INDUSTRIAL APPLICABILITY

As having been described in the foregoing, the recording medium according to the present invention is a tape cassette provided with a memory (MIC) to store a system log (management information) according to which data is written to and read from a magnetic tape contained in the cassette, with the memory storing data format identification information (MIC type) indicative of a data format which the tape cassette can support.

With the tape drive according to the present invention, it is possible to detect identification information (MIC type) stored in the memory (MIC) provided in a loaded tape cassette, to thereby identify the data format the tape cassette can support. The tape drive is internally set to operate in a mode corresponding to a data format thus identified, for example.

For example, in case a detection hole is formed in the tape cassette to identify the data format in which each tape cassette has data recorded therein, if the data format type is increased in number as the data format is extended, more detection holes have to be formed in the tape cassette and also the hole detecting mechanism in the tape drive will unavoidably be complicated accordingly. That is, it is difficult to accommodate the future extension data format.

According to the present invention, however, an increased number of data format types can easily be accommodated by storing in the memory (MIC) identification information with which the data format is identified. and a tape streaming drive.

What is claimed is:

1. A recording medium comprising:

a magnetic tape;

a cassette encasing the magnetic tape; and a memory provided in the cassette to store management information for management of data written to and read from the magnetic tape; wherein the magnetic of tape accommodates a data format for data written to and read from the magnetic tape magnetic tape and which corresponds to any of a plurality of predetermined data formats; and wherein the memory includes a storage area for storage of data format identification information indicative of the data format of the data written to and read from the magnetic tape, wherein the memory is provided with transmission and reception means for non-contact transfer of an information signal.

2. The recording medium as set forth in claim 1, wherein the memory is provided with terminals for transfer of information signals and said terminals face an outside of the cassette.

3. The recording medium as set forth in claim 1, wherein the magnetic tape has an area where an information signal is recorded, with the area divided into at least three partitions.

4. The recording medium as set forth in claim 1, wherein system log allocation flags included in data format identification information recorded in the magnetic tape indicate that data format identification information is recorded in the magnetic tape, so that the data format identification information is read from the magnetic tape when the data format identification information cannot be read from the memory.

5. A recorded medium comprising:

a magnetic tape;

a cassette encasing the magnetic tape; and a memory provided in the cassette to store management information for management of data written to and read from the magnetic tape, wherein the magnetic tape accommodates a data format for data written to and read from the magnetic tape and which corresponds to any of a plurality of predetermined data formats, wherein the memory includes a storage area for storage of data format identification information indicative of the data format of the data written to and read from the magnetic tape, wherein system log allocation flags included in data format identification information recorded in the magnetic tape indicate that data format identification information is recorded in the magnetic tape, so that the data format identification information is read from the magnetic tape when the data format identification information cannot be read from the memory, wherein it is judged, based on a native flag included in the data format identification information read from the magnetic tape, whether the area of the magnetic tape where the information signal is recorded has a format in which the area is divided into at least three partitions and whether the area has a format in which the area is in a normal format.

6. A tape drive to write and read an information signal to and from a recording medium including a magnetic tape, a cassette encasing the magnetic tape, and a memory provided in the cassette to store management information for management of data written to and read from the magnetic tape, wherein the magnetic tape accommodates a data format for data written to and read from the magnetic tape and which corresponds to any of a plurality of predetermined data formats, and wherein the memory includes a storage area for storage of data format identification information indicative of the data format of the data written to and read from the magnetic tape, the tape drive comprising:

tape driving means for writing and reading an information signal to and from the magnetic tape in a loaded recording medium;

memory reading means for reading at least the data format identification information from the management information stored in the memory in the loaded recording medium;

data format identifying means for identifying, based on the data format identification information read by the memory reading means, a data format of the loaded recording medium;

controlling means for controlling the data driving means, wherein the tape driving means writes and reads the information signal in a data format selected from at least two of the plurality of predetermined data formats, and wherein the controlling means allows the tape driving means to write and read in the data format identified by the data format identifying means; and a hole detecting mechanism to detect whether a cleaning cassette identification hole is formed in the cassette, wherein whether the loaded recording medium is a cleaning cassette is based on a result of detection of the cleaning cassette identification hole by the hole detecting mechanism, and when the recording medium is judged to be the cleaning cassette, a mode of operation in which the cleaning cassette is used is operated, while when the recording medium is judged not to be the cleaning cassette, the memory reading means reads the data format identification information from the memory and it is judged whether the memory is provided with terminals for transfer of the information signal and whether the memory is provided with transmitting and reception means for non-contact transfer of the information signal.

7. A tape drive to write and read an information signal to and from a recording medium including a magnetic tape, a cassette encasing the magnetic tape, and a memory provided in the cassette to store management information for management of data written to and read from the magnetic tape, wherein the magnetic tape accommodates a data format for data written to and read from the magnetic tape and which corresponds to any of a plurality of predetermined data formats, and wherein the memory includes a storage area for storage of data format identification information indicative of the data format of the data written to and read from the magnetic tape, the tape drive comprising:

tape driving means for writing and reading an information signal to and from the magnetic tape in a loaded recording medium;

memory reading means for reading at least the data format identification information from the management information stored in the memory in the loaded recording medium;

data format identifying means for identifying, based on the data format identification information read by the memory reading means, a data format of the loaded recording medium;

controlling means for controlling the data driving means, wherein the tape driving means writes and reads the information signal in a data format selected from at least two of the plurality of predetermined data formats, and wherein the controlling means allows the tape driving means to write and read in the data format identified by the data format identifying means, wherein when the data format identification information cannot be read from the memory, the data format identification information is read from the magnetic tape when system log allocation flags included in the data format identification information read from the magnetic tape show that the data format identification information is recorded in the magnetic tape, based on whether a native flag included in the data format identification information read from the magnetic tape indicates whether the area of the recording medium where the information signal is recorded is divided into at least three partitions and whether the area is in a normal format, and when it is judged that the area of the magnetic tape in which the information signal is recorded is divided into at least three partitions, the memory is regarded as faulty and the magnetic tape is used as a read-only magnetic tape with prevention of the information signal from being written to the magnetic tape, while when it is judged that the magnetic tape area in which the information signal is recorded is in the normal format, the recording medium is regarded as not provided with memory.

8. A tape drive to write and read an information signal to and from a recording medium including a magnetic tape, a cassette encasing the magnetic tape, and a memory provided in the cassette to store management information for management of data written to and read from the magnetic tape, wherein the magnetic tape accommodates a data format for data written to and read from the magnetic tape and which corresponds to any of a plurality of predetermined data formats, and wherein the memory includes a storage area for storage of data format identification information indicative of the data format of the data written to and read from the magnetic tape, the tape drive comprising:

tape driving means for writing and reading an information signal to and from the magnetic tape in a loaded recording medium;

memory reading means for reading at least the data format identification information from the management information stored in the memory in the loaded recording medium;

data format identifying means for identifying, based on the data format identification information read by the memory reading means, a data format of the loaded recording medium;

controlling means for controlling the data driving means, wherein the tape driving means writes and reads the information signal in a data format selected from at least two of the plurality of predetermined data formats, and wherein the controlling means allows the tape driving means to write and read in the data format identified by the data format identifying means;

a hole detecting mechanism for detecting whether a write protect hole preventing writing of the information signal is formed in the cassette; and a stripe sensor for optically detecting an identification stripe formed on the magnetic tape; wherein when the data format identification information cannot be read from the memory and reading data format identification information from the magnetic tape is impossible, it is judged, based on the result of write protect hole detection, whether writing of the information signal is prevented; while when it is judged that writing of the information signal is not prevented, the magnetic tape is judged to have the format in which the area of the magnetic tape where the information signal is recorded is in a normal format; and when it is judged that writing of the information signal is prevented via identification of the identification stripe by the stripe sensor; when the identification stripe is not detected, it is judged that the memory is not provided and the area of the magnetic tape where the information signal is recorded has the format in which the area is in the normal format; and when the identification stripe is detected, reading of the data identification information from the magnetic tape is attempted.

9. The tape drive as set forth in claim 8, wherein when it is judged that the memory is not provided and the area of the magnetic tape where the information signal is recorded has the format in which the area is in the normal format, the magnetic tape is considered a blank tape in which the information signal is not yet recorded.

10. A recording medium type identifying method for identification of a data format of a recording medium to and from which an information signal is written and read and which includes a magnetic tape, a cassette encasing the magnetic tape, and a memory provided in the cassette to store management information for management of data written to and read from the magnetic tape, the magnetic tape having a data format for data written to and read from the magnetic tape and which corresponds to one of a plurality of predetermined data formats, and the memory including a storage area for storage of data format identification information indicative of the data format of the data written to and read from the magnetic tape, the method comprising steps of:

reading at least the data format identification information from the management information stored in the memory in the recording medium;

identifying, based on the data format identification information, a data format of the loaded recording medium; and detecting whether a cleaning cassette identification hole is formed in the cassette of the recording medium, and when it is judged based on a result of detection of the cleaning cassette identification hole that the recording medium used is not the cleaning cassette, the data format identification information is read from the memory and it is judged whether the memory is provided with terminals for transfer of the information signal and whether the memory is provided with transmitting and reception means for non-contact transfer of the information signal.

11. A recording medium type identifying method for identification of a data format of a recording medium to and from which an information signal is written and read and which includes a magnetic tape, a cassette encasing the magnetic tape, and a memory provided in the cassette to store management information for management of data written to and read from the magnetic tape, the magnetic tape having a data format for data written to and read from the magnetic tape and which corresponds to one of a plurality of predetermined data formats, and the memory including a storage area for storage of data format identification information indicative of the data format of the data written to and read from the magnetic tape, the method comprising steps of:

reading at least the data format identification information from the management information stored in the memory in the recording medium;

identifying, based on the data format identification information, a data format of the loaded recording medium; and wherein when the data format identification information cannot be read from the memory, the data format identification information is read from the magnetic tape when system log allocation flags included in the data format identification information read from the magnetic tape show that the data format identification information read from the magnetic tape shows that the data format identification information is recorded in the magnetic tape, and it is judged based on a native flag included in the data format identification information read from the magnetic tape whether the area of the recording medium where the information signal is recorded is divided into at least three partitions and whether the area is in a normal format;

when it is judged that the area of the magnetic tape in which the information signal is recorded is divided into at least three partitions, the memory is regarded as being faulty and the magnetic tape is used as a read-only magnetic tape with the information signal prevented from being written to the magnetic tape; and when it is judged that the magnetic tape area in which the information signal is recorded is in the normal format, the recording medium is regarded as not provided with the memory.

12. A recording medium type identifying method for identification of a data format of a recording medium to and from which an information signal is written and read and which includes a magnetic tape, a cassette encasing the magnetic tape, and a memory provided in the cassette to store management information for management of data written to and read from the magnetic tape, the magnetic tape having a data format for data written to and read from the magnetic tape and which corresponds to one of a plurality of predetermined data formats, and the memory including a storage area for storage of data format identification information indicative of the data format of the data written to and read from the magnetic tape, the method comprising steps of:

reading at least the data format identification information from the management information stored in the memory in the recording medium;

identifying, based on the data format identification information, a data format of the loaded recording medium; and when the data format identification information cannot be read from the memory and reading of the data format identification information from the magnetic tape is impossible, it is judged, based on a result of write protect hole detection, whether writing of the information signal is prevented; wherein when it is judged that writing of the information signal is not prevented, the magnetic tape is judged to have the area of the magnetic tape where the information signal is recorded is in a normal format; and when it is judged that writing of the information signal is prevented, via identification of an identification stripe by a stripe sensor, when the identification stripe is not detected, it is judged that the memory is not provided and the area of the magnetic tape where the information signal is recorded is in the normal format, and when the identification stripe is detected, reading of the data identification information from the magnetic tape is attempted.

13. The method as set forth in claim 12, wherein when it is judged that the memory is not provided and the area of the magnetic tape where the information signal is recorded is in the normal format, the magnetic tape is judged to be a blank tape in which the information signal is not yet recorded.

* * * * *